(12) United States Patent
Kuklish et al.

(10) Patent No.: US 9,459,624 B2
(45) Date of Patent: Oct. 4, 2016

(54) SEMI-AUTONOMOUS DOLLY

(71) Applicant: Mega Trax Corporation, Valley Village, CA (US)

(72) Inventors: David Kuklish, Burbank, CA (US); Howard McCain, Valley Village, CA (US)

(73) Assignee: MEGA TRAX CORPORATION, Valley Village, CA (US)

( * ) Notice: Subject to any disclaimer, the term of this patent is extended or adjusted under 35 U.S.C. 154(b) by 4 days.

(21) Appl. No.: 14/325,026

(22) Filed: Jul. 7, 2014

(65) Prior Publication Data
US 2015/0012168 A1 Jan. 8, 2015

Related U.S. Application Data

(60) Provisional application No. 61/843,790, filed on Jul. 8, 2013.

(51) Int. Cl.
| | |
|---|---|
| *G01C 22/00* | (2006.01) |
| *G05D 1/02* | (2006.01) |
| *G03B 17/56* | (2006.01) |
| *F16M 11/18* | (2006.01) |
| *F16M 11/42* | (2006.01) |
| *H04N 5/222* | (2006.01) |

(52) U.S. Cl.
CPC ............... *G05D 1/02* (2013.01); *F16M 11/18* (2013.01); *F16M 11/425* (2013.01); *G03B 17/568* (2013.01); *H04N 5/222* (2013.01)

(58) Field of Classification Search
CPC ...... G03B 17/561; G03B 17/56; G05D 1/02; G01B 15/00
USPC .......................................................... 701/23
See application file for complete search history.

(56) References Cited

U.S. PATENT DOCUMENTS

| | | | | |
|---|---|---|---|---|
| 5,282,424 A * | 2/1994 | O'Neill | ................... | B61B 13/10 104/138.1 |
| 5,842,069 A * | 11/1998 | Konno | ................... | B61B 13/122 348/157 |
| 6,679,181 B2 * | 1/2004 | Fox | ........................... | B60D 1/36 104/20 |
| 6,857,493 B2 * | 2/2005 | Shupp | ....................... | B60T 7/16 180/168 |
| 2001/0037746 A1 * | 11/2001 | Lund | ....................... | B61B 13/00 104/88.03 |
| 2001/0056544 A1 * | 12/2001 | Walker | ................... | B60P 25/02 726/2 |
| 2011/0144849 A1 * | 6/2011 | Wang | ....................... | B61B 3/02 701/23 |
| 2012/0027544 A1 * | 2/2012 | Wang | ................. | H01L 21/67253 414/222.01 |
| 2012/0078442 A1 * | 3/2012 | Young | ................... | A63H 19/24 701/2 |
| 2012/0290251 A1 * | 11/2012 | Groeneweg | .......... | B61L 23/042 702/130 |

OTHER PUBLICATIONS

PCT International Search Report and Written Opinion, PCT/US2014/045604, Oct. 31, 2014, 12 pages.

* cited by examiner

*Primary Examiner* — Shardul Patel
(74) *Attorney, Agent, or Firm* — Patent Law Works LLP

(57) ABSTRACT

Various systems and methods are disclosed herein. In one embodiment, a system comprises a track comprising one or more sections, the track including track indicators readable by a track indicator sensor and used to determine a dolly's position on the track, and the dolly including one or more sensors and a processor, the one or more sensors including the track indicator sensor, the processor executing instructions that control an operation of the dolly including moving the dolly at least semi-autonomously along the track based on the track indicators, wherein moving the dolly at least semi-autonomously includes one of moving the dolly autonomously and moving the dolly semi-autonomously.

20 Claims, 26 Drawing Sheets

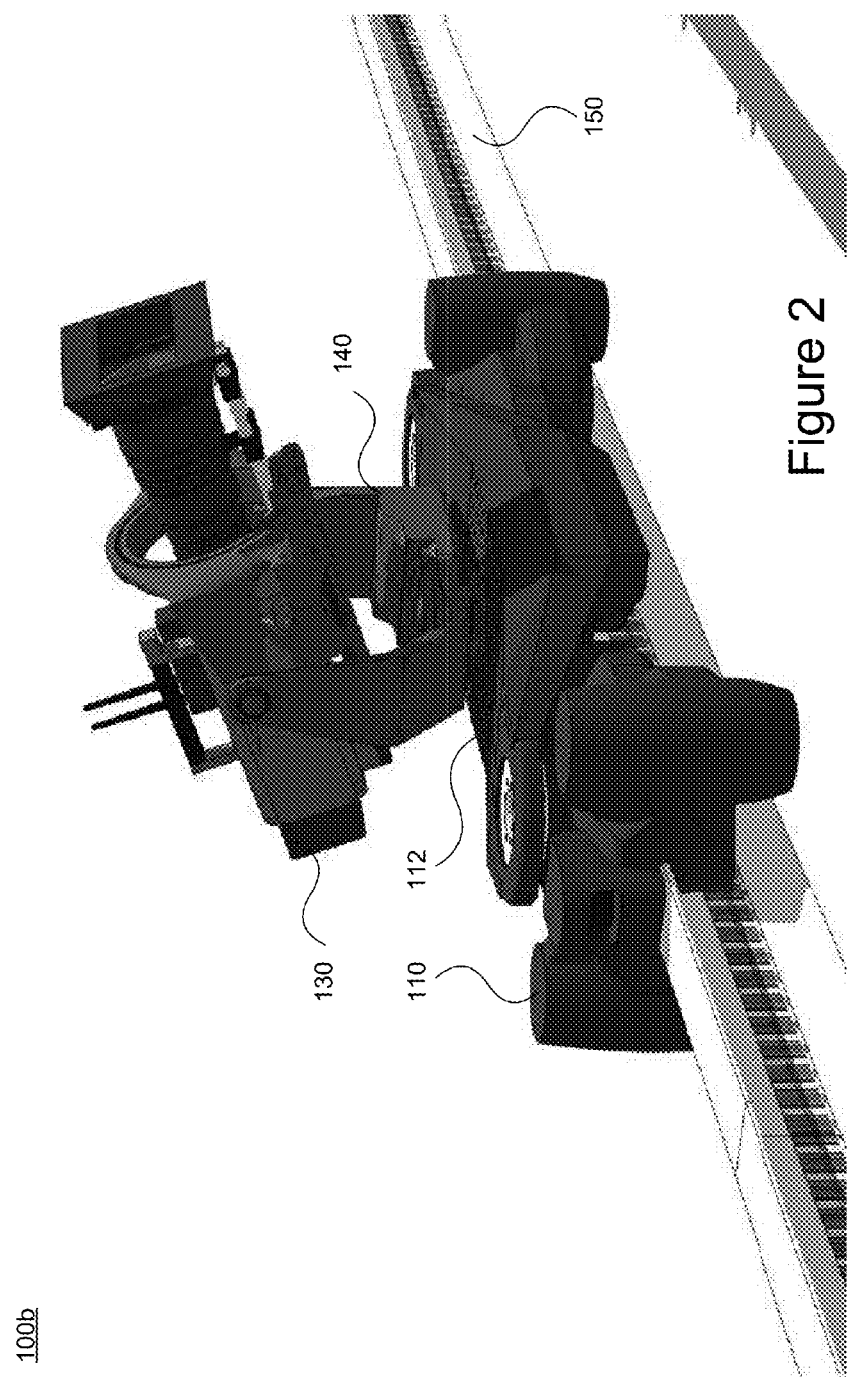

SEMI-AUTONOMOUS DOLLY

CROSS REFERENCE TO RELATED APPLICATIONS

This application claims the benefit of U.S. Provisional Patent Application No. 61/843,790, filed Jul. 8, 2013, and titled "Semi-Autonomous, RF-Controlled Dolly/Trolley," the entire contents of which is incorporated herein by reference.

BACKGROUND

For the filmmaker, moving the camera with both speed and precision is often a challenge. Traditional film "motion-control" track and dolly systems are often very heavy, difficult to set up, relatively slow in speed, usually limited to short lengths of straight track, and are not able to transition to vertically curved or compound curved track. They drag cables behind them and require special technicians to operate them. Traditional "manual" film dollies, on the other hand, while much simpler, are also time consuming to set up over longer distance and rough terrain, slow because they are manually powered, and non-repeatable. Finally, mounting cameras on chase vehicles is non-repeatable, limited to drivable terrain, and often dangerous. What is needed is system that that addresses one or more of these shortcomings and/or introduces new capabilities that the prior systems lack.

SUMMARY

According to one innovative aspect of the subject matter described in this disclosure a dolly system comprises a track comprising one or more sections, the track including track indicators readable by a track indicator sensor and used to determine a dolly's position on the track; and the dolly includes one or more sensors and a processor, the one or more sensors including the track indicator sensor, the processor executing instructions that control an operation of the dolly including moving the dolly at least semi-autonomously along the track based on the track indicators, wherein moving the dolly at least semi-autonomously includes one of moving the dolly semi-autonomously and moving the dolly fully autonomously. Other aspects include corresponding methods, systems, apparatus, and computer program products.

The system may optionally include one or more of the following features. For instance, the features include: one or more of repeating a previous operation of the dolly and operating the dolly safely using monitored sensor data and a safety protocol. For instance, the features include: recording sensor data from the one or more sensors of the dolly during a first operation of the dolly, the sensor data describing the first operation of the dolly and, responsive to receiving a request to repeat the first operation of dolly during a subsequent operation of the dolly, determining one or more control signals for repeating the first operation of the dolly based on the recorded sensor data and automatically operating the dolly based on the one or more determined control signals thereby repeating the first operation of the dolly in the subsequent operation of the dolly. For instance, the features include: the first operation of the dolly including movement of the dolly along a track based the track indicators and operation of one or more devices associated with the dolly. For instance, the features include: determining a threshold associated with a parameter; monitoring sensor data associated with the parameter, the sensor data from the one or more sensors; determining that the sensor data satisfies the threshold associated with the parameter; determining a safety protocol associated with the satisfied threshold responsive to determining that the threshold is satisfied; and operating a dolly based on the determined safety protocol. For instance, the features include: a track indicator is a barcode.

In general another innovative aspect of the subject matter described in this disclosure may be embodied in methods that include receiving, using one or more processors, sensor data from one or more sensors of a dolly during a first operation of the dolly, the sensor data describing the first operation of the dolly; recording, using the one or more processors, the sensor data; receiving, using the one or more processors, a request to repeat the first operation of dolly during a subsequent operation of the dolly; determining, using the one or more processors, one or more control signals based on the recorded sensor data for repeating the first operation of the dolly; and automatically operating, using the one or more processors, the dolly based on the one or more determined control signals thereby repeating the first operation of the dolly in the subsequent operation of the dolly. Other aspects include corresponding methods, systems, apparatus, and computer program products.

The method may optionally include one or more of the following features. For instance, the features include: the operation of the dolly including movement of the dolly along a track based sensor data associated with a track indicator and operation of one or more devices associated with the dolly. For instance, the features include: the operation of the dolly includes a movement of the dolly along a track and an operation of a device associated with the dolly, wherein the sensor data includes sensor data describing the movement of the dolly along a track, which is received and recorded as a first set of one or more channels, and sensor data describing the operation of the device associated with the dolly, which is received and recorded as a second set of one or more channels, and a user individually modifies one or more selected channels to alter the subsequent operation of the dolly. For instance, the features include: the operation of the dolly includes a movement of the dolly along a track and an operation of a multi-axis camera head and automatically operating the dolly based on the one or more determined control signals repeats the movement of the dolly along a track and the operation of the multi-axis camera head. For instance, the features include: the first operation of the dolly is controlled at least in part by control signals from user input and, responsive to receiving the request to repeat the first operation of the dolly, the one or more control signals are determined and the dolly is operated automatically and without further user input. For instance, the features include: the first operation of the dolly is performed manually by a human user and repeated automatically when the dolly determines the one or more control signals and operates itself.

In general another innovative aspect of the subject matter described in this disclosure may be embodied in methods that include determining, using one or more processors, a threshold associated with a parameter for safely operating a dolly on a track; monitoring, using the one or more processors, sensor data associated with the parameter, the sensor data from one or more sensors; determining, using the one or more processors, that the sensor data satisfies the threshold associated with the parameter; determining, using the one or more processors, a safety protocol associated with the satisfied threshold responsive to determining that the threshold is satisfied; and operating, using the one or more processors, the dolly based on the determined safety protocol. Other aspects include corresponding methods, systems, apparatus, and computer program products.

The method may optionally include one or more of the following features and operations. For instance, the operations for monitoring sensor data associated with the parameter include: determining a position of the dolly on a track based at least in part on sensor data associated with a track indicator; and determining a safety parameter associated with the position of the dolly on the track. For instance, the operations for determining a position of the dolly on a track based at least in part on sensor data associated with a track indicator include determining whether a most recent track indicator received from a track indicator sensor is a live track indicator, wherein the live track indicator is associated with a position on the track where the dolly is presently; responsive to determining that the most recent track indicator is a live track indicator, determining that the dolly's position on the track is the position associated with the most recent track indicator; and responsive to determining that the most recent track indicator is not a live track indicator, determining a distance traveled since the most recent track indicator was received and determining that the dolly's position on the track is the determined distance from the most recent track indicator. For instance, the features include: the track indicator is a barcode and a plurality of barcodes run the length of the track. For instance, the features include: the sensor data satisfies the threshold associated with the parameter when the sensor data indicates an obstruction or break in a track. For instance, the features include: the sensor data satisfies the threshold associated with the parameter when the sensor data indicates that an end of the track is approaching. For instance, the features include: wherein the sensor data satisfies the threshold associated with the parameter when the sensor data indicates one or more of the dolly's speed exceeds a maximum speed and the dolly's payload is exerting a torque in excess of a maximum torque. For instance, the operations for determining a threshold associated with a parameter for safely operating a dolly on a track include receiving sensor data including track indicators detected using a track indicator sensor while traversing the dolly across the track during a slow-speed initialization; generating a virtual model based at least in part on the received track indicators, the virtual model representing the track's configuration; and determining the threshold based on the virtual model.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

FIG. 2 illustrates another example of a dolly system according to one embodiment.

DETAILED DESCRIPTION

Figure 1:
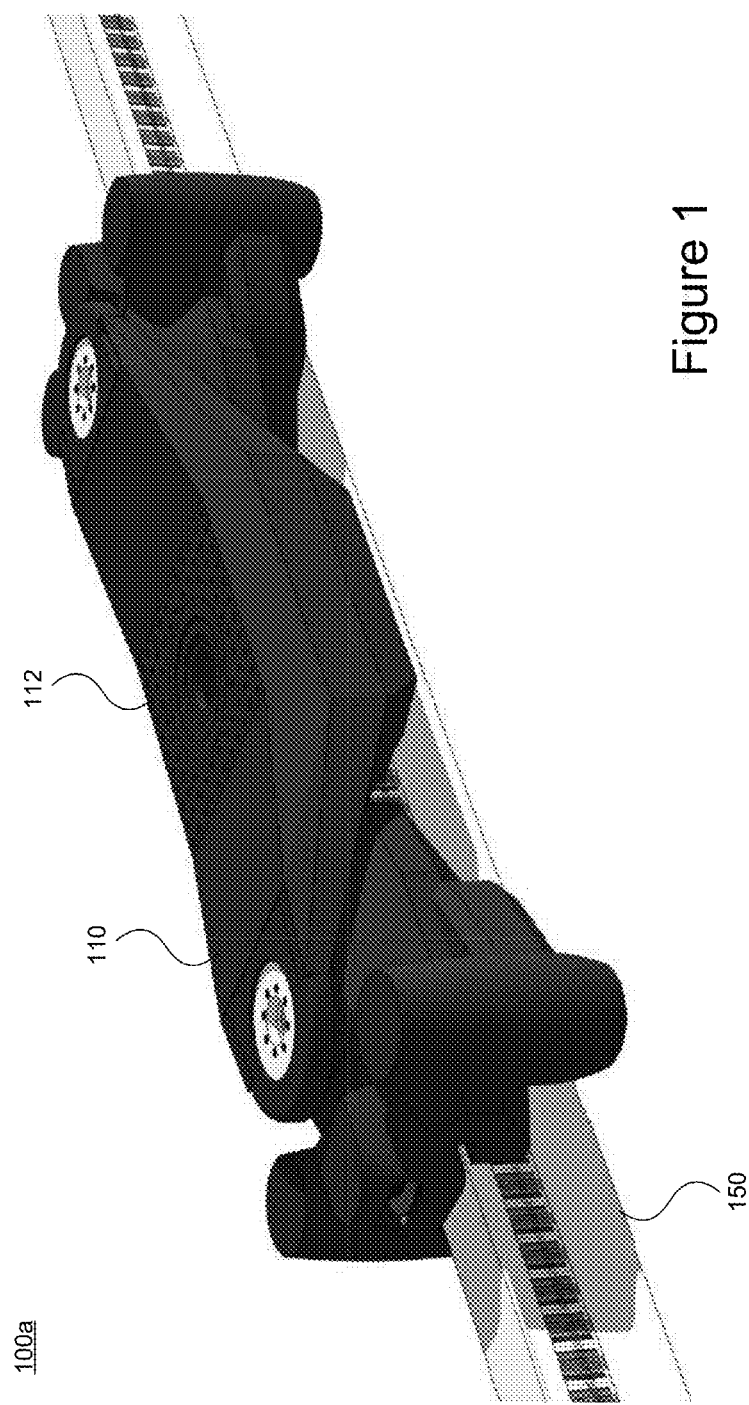
FIG. 1 illustrates an example of a dolly system according to one embodiment.

Systems, methods and interfaces are disclosed. While the systems, methods and interfaces of the present disclosure are described in the context of film and television, it should be understood that the systems, methods and interfaces can be applied in other contexts.

In one embodiment, the dolly system described herein is a multi-purpose system that can be used in various industries, for example, the film and television industries, the sports broadcast industry, live events or special venues. In some embodiments, the dolly system is capable of one or more of action photography (e.g. stunts, sports, pyrotechnics, visual effects, etc.), high speed, fast acceleration, motion control, remote operation (which may improve ease of use, safety or accessibility), performing on one or more of curves, hills and vertically, inverted (under slung) track applications, performing in non-ideal environments (e.g. wet, dusty, humid, etc.), quick set-up (e.g. using existing "grip" technology); easy operation (e.g. no special operator normally required), wireless operation (e.g. no cables or wires are dragged), quiet operation, operating at least semi-autonomously, operating with repeatability and operating safely.

In one embodiment, the uses a monorail track. In one embodiment, the dolly 110 is a high-performance dolly capable of being controlled by a variety of mechanisms. For example, depending on the embodiment, the dolly 110 may be controlled manually by a user pushing the dolly 110 along the track, or the dolly may be radio frequency (RF) controlled in real-time by one or more camera and dolly operators, or the dolly 110 may be at least semi-autonomously controlled, or the dolly 110 may be controlled by a combination thereof.

Depending on the embodiment, the dolly 110 may be capable of operating at one or more degrees of autonomy. In one embodiment, the dolly 110 may operate at least semi-autonomously (i.e. one or more of semi-autonomously and/or fully autonomously depending on the embodiment). For example, in one embodiment, the dolly 110 may operate semi-autonomously (e.g. filtering control signals from human user input for smooth operation, overriding control signals to maintain safe operating conditions, playing back aspects of a previously recorded operation of the dolly while a human user controls another aspect of the dolly's operation in real-time during the play back, etc.) or fully autonomously according to preprogrammed routines, independent of direct human control input and based on sensor data (e.g. coordinating with another dolly to track objects, playing back a previously recorded dolly operation, according to a factory automation program, etc.).

In one embodiment, the degree of autonomy is controlled by the user. For example, the user may choose to operate the dolly 110 manually by pushing the dolly 110 (e.g. to record or "teach" a move) then decide to subsequently operate the dolly fully autonomously (e.g. to have the dolly 110 repeat the move without user input or control).

In one embodiment, the dolly 110 includes intelligence (e.g. includes processing and routines for operating at least semi-autonomously), radio control, the latest in battery technology, and an innovative and configurable monorail track system. In one embodiment, the system 100 is fast to setup and intuitively easy to operate by regular film crews thus avoiding the additional high cost of needing to employ specifically trained technicians. In one embodiment, one or more safety features are integrated into the dolly system.

Referring to FIG. 1, an example of the dolly system 100a is shown according to one embodiment. In the Illustrated embodiment, the dolly system 100a includes a dolly 110 and a track 150. However, it will be recognized that depending on the embodiment the system may include additional components and features. In some embodiments, the system may include one or more of a camera head, lens control system, control console(s), etc. For example, referring now to FIG. 2, a dolly system 100b is illustrated and includes the dolly 110, a camera head 140, camera 130 and track 150 according to one embodiment. In one embodiment, the camera head 140 is a fully integrated multi-axis head (e.g. pan, tilt, roll, zoom, iris, etc.), and can accommodate a full-size motion picture camera.

Referring to FIG. 1, in one embodiment, the dolly 110 includes mounting hardware 112. Examples of mounting hardware may include, but is not limited to mounting hardware for a camera head (e.g. a cheese plate or Mitchell-style mounting plate), mounting hardware for a boom, lights, people (e.g. using a harness and rigging), a model, accessories or other objects. Referring to FIG. 2, the camera head 140 is physically secured to the dolly 110 using the mounting hardware 112.

The track 150 includes track indicators and the dolly 110 includes one or more track indicator sensors. For clarity and convenience, the example embodiments discussed herein may use a barcode as an example of a track indicator and a barcode reader as an example of a track indicator sensor. However, it should be recognized these are merely examples and other track indicators and other track indicator readers may be used without departing from the disclosure herein. For example, the track indicator may be optical (e.g. a 2D barcode, a 3D barcode or QR code, etc.) tactile (e.g. raised bumps or ridges, etc.) or any other sensor readable indicator, and the track sensor indicator may be any sensor capable of detecting a track indicator. It should be noted that the dolly 110 and track 150 have many features and components, which are discussed in the detailed description and some (e.g. regenerative braking, inductive charging, suspension system including bogies, track switch plates and end caps, various track connectors, etc.), which are discussed in the appendices and therefore also within the scope of the disclosure herein.

Figure 3D:
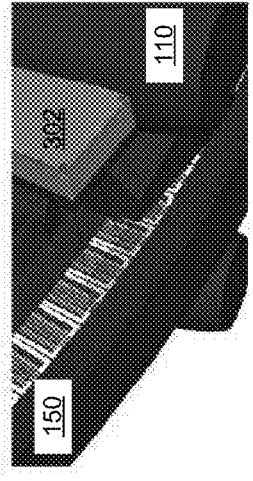
FIGS. 3A-3F illustrate examples of a track indicator and track indicator sensor according to one embodiment.
Figure 3E:
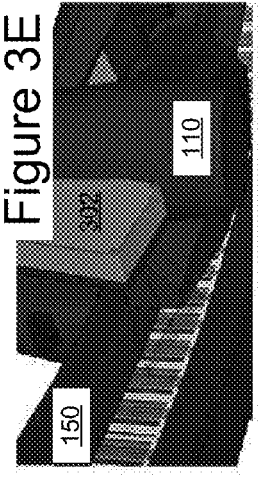
Figure 3F:
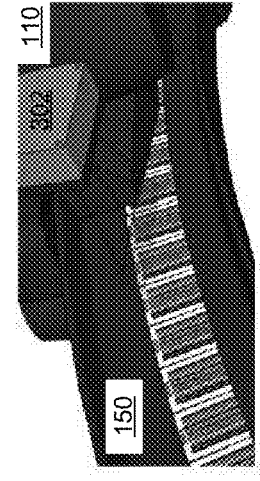
Figure 3C:
Figure 3B:
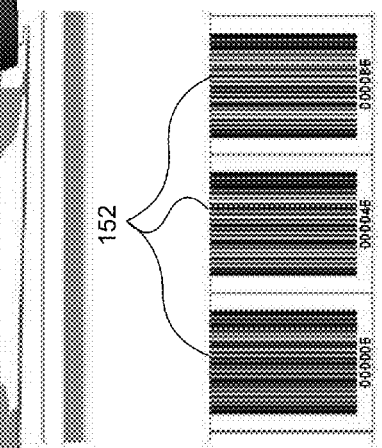
Figure 3A:
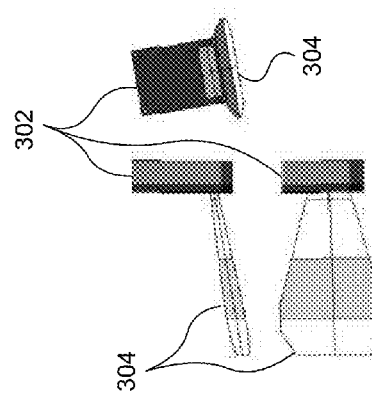

Referring now to FIGS. 3A-3F, the dolly 110 includes a track indicator sensor and the track 150 includes track indicators according to some embodiments. FIG. 3A illustrates an embodiment in which a high-speed barcode reader 302 is the track indicator sensor. In the illustrated embodiment, the barcode reader 302 has a sensor field 304 within which the barcode reader may detect a barcode 152 (i.e. a track indicator). The shaded portion of the sensor field 304 is portion of the field in which the barcode reader 302 is best able to read barcodes 152. FIG. 3B illustrates an embodiment in which the track 150 includes barcodes 152 as the track indicators. FIGS. 3C-3F illustrate an embodiment in which the barcode reader 302 is included on the dolly 110 and configured so that barcodes 152 are presented in the shaded portion of the sensor field 304 whether the track is straight, as in FIG. 3C, curves vertically up or down, as in FIGS. 3D and 3F, respectively, or curves horizontally right or left, as in FIG. 3E.

Referring again to FIG. 3B, in the illustrated embodiment, the track 150 has an I-beam structure and the barcodes 152 are placed end-to-end along the length of the web of the track 150 and each section of track has a length that is an integer multiple of (and evenly divisible by) a barcode's length so each track length has barcodes stretching from end-to-end with no partial barcode at either end. In the illustrated embodiment, the barcodes 152 numerical values are sequential and increment by 40. In one embodiment, the increment between sequential barcodes is determined by the width of the barcode. For example, in one embodiment, the barcodes 152 of FIG. 3B increment by 40 because the barcodes are 40 mm wide.

In one embodiment, a track indicator is used for one or more purposes including, but not limited to verifying that the track section is an authorized/approved piece of track, modeling the configuration of the track 150, determining a position of the dolly 110 along the track 150, recording for later use in repetition of the movement of a dolly 110 along the track 150, determine one or more safety parameters, etc.

Figure 4:
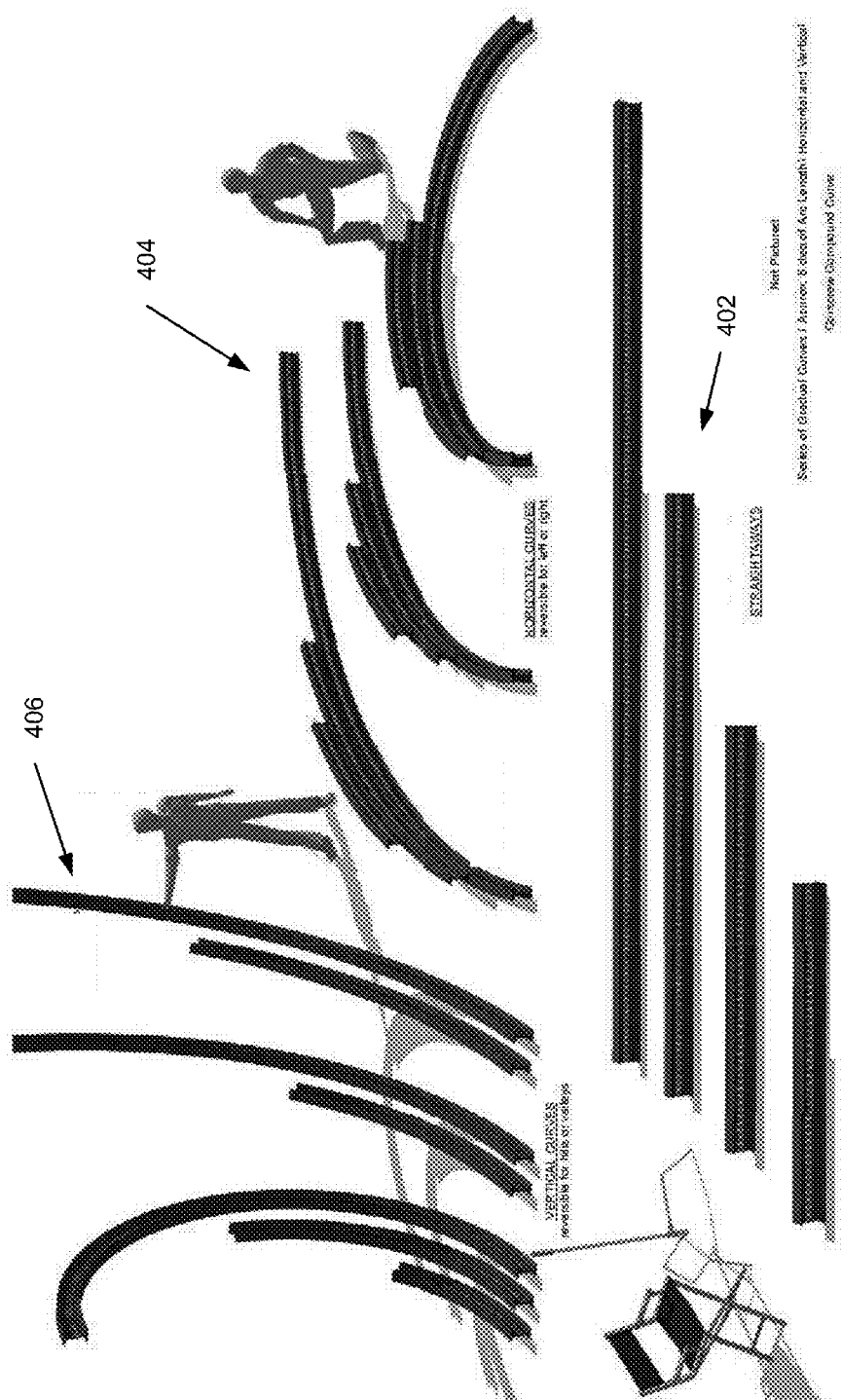
FIG. 4 illustrates examples of track sections according to one embodiment.

The track 150 may include on or more modular sections of track. The modular sections of track may further include a variety of track types which may be connected to create different track configurations. A track's configuration may also occasionally be referred to as the track's "layout." Referring now to FIG. 4, examples of various different track sections 402, 404, 406 are shown according to some embodiments. In one embodiment, the track 150 may include one or more of straight track sections, which may come in one or more lengths as shown at 402, horizontally curved sections, which may come in one or more arc lengths and radii as shown at 404, and vertically curved sections, which may come in one or more arc lengths and radii as shown at 406. It should be recognized that the track sections 402, 404, 406 are merely examples of track sections and others exist. For example, track sections that have compound curves (e.g. banked corners, corkscrew, etc.), different arc lengths, radii, lengths, track switching mechanisms, end pieces (e.g. those described in the appendices), etc. may be used and are within the scope of this disclosure. Furthermore, it should be recognized that while the track 150 discussed herein has an I-beam cross section. Tracks with different physical configurations (e.g. a "T" cross section, etc.) may be used in some embodiments.

In one embodiment, different types, lengths, radii, etc. of track sections are each associated with a unique range of track indicators. For example, barcodes within a first range of values may be associated with straight track of length A, barcodes within a second range of values may be associated with straight track of length B, barcodes within a third range may be associated with a 45 degree horizontal curve with a 5 foot radius, etc. In some embodiments, similar sections of track will have different, perhaps unique, barcode values. For example, a first section of straight track having length A includes sequential barcodes from value A to B and a second section of straight track having length A includes sequential barcodes from value C to value D, where values A, B, C and D are within the first range of values associated with straight track of length A. It should be recognized that the preceding are merely examples of associating specific track indicators to specific track sections and that other examples exist and may be used without departing from the disclosure herein. In some embodiments, the range of indicators on a detected section of track are utilized by the dolly control module 1220, discussed below with reference to FIG. 14, to identify the type, length, radii etc. of the detected track section when generating a model of the track's configuration and safety parameter thresholds.

Figure 5:
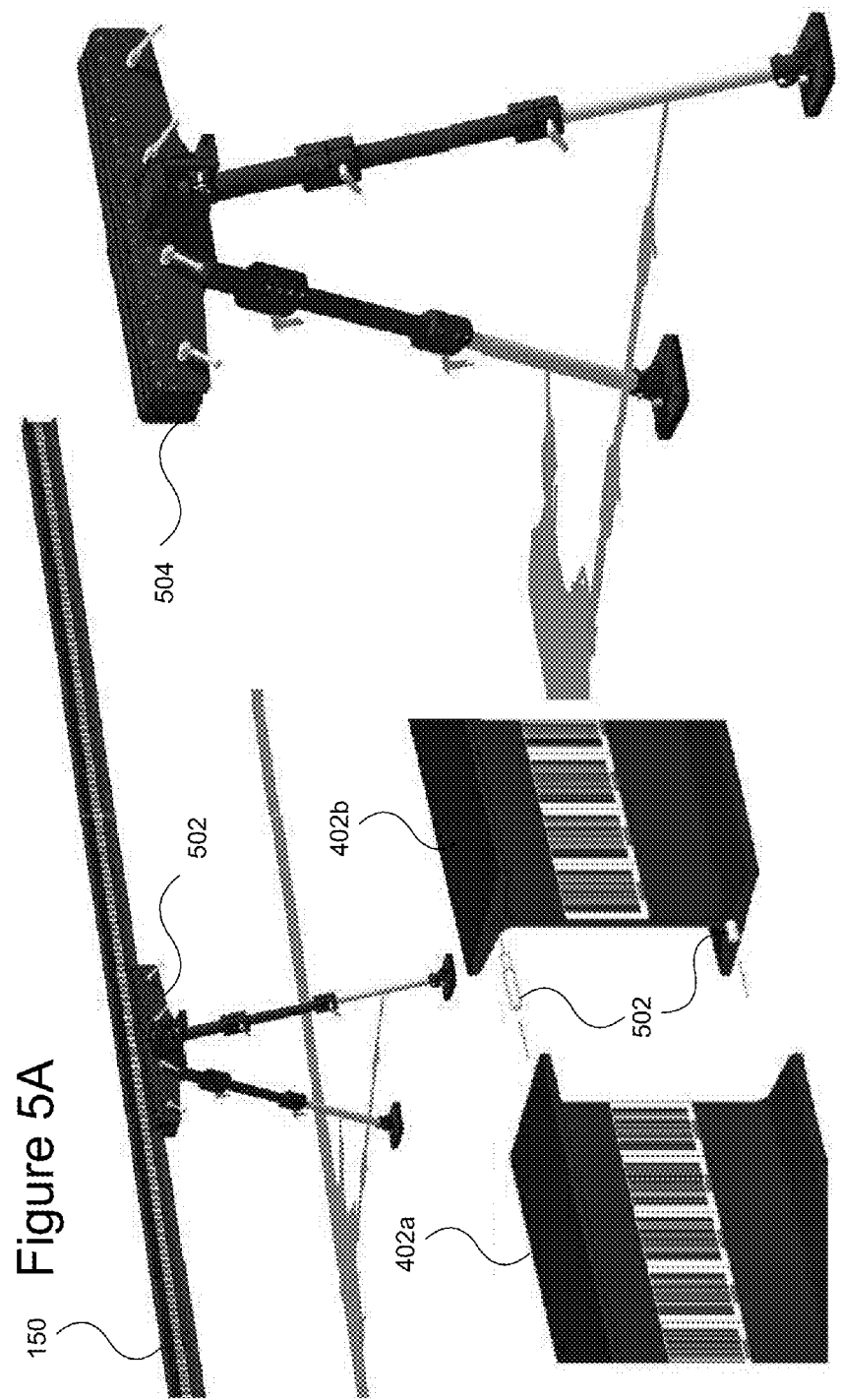
FIGS. 5A-C illustrate an example of track connection according to one embodiment.

The modular sections of track may be connected to one another to create a desired configuration. The connectors used to connect the track sections may depend on variables such as one or more of the track sections being connected (e.g. straight-to-straight, straight-to-horizontally curved, straight-to-vertically curved, horizontally curved-to-horizontally curved, vertically curved-to-vertically curved, etc.), the terrain over which the track passes, the object(s) to which the track is to be affixed, the desired height of the dolly 110 or the camera's 130 desired height, etc. FIGS. 5A-5C illustrate an example of a connection according to one embodiment. FIG. 5B illustrates two sections of track 402a and 402b. In one embodiment, the track sections each have matching holes on their ends, which receive registration pins 502. The registration pins 502 may beneficially align the track sections 402a and 402b with one another to ensure the dolly's 110 smooth transition from one section of track to another. FIG. 5C illustrates a connector 504 according to one embodiment. In the illustrated embodiment, the connector 504 has adjustable (e.g. telescopic and/or pivoting) legs and clamps the two sections 402a, 402b of track together to form track 150. In one embodiment, connector 504 may be fitted with standard size scaffold and rigging pipe. It should be recognized that FIGS. 5A-5C describer merely one example connector and other connectors exist including, for example, the connectors described in the appendices.

Figure 6:
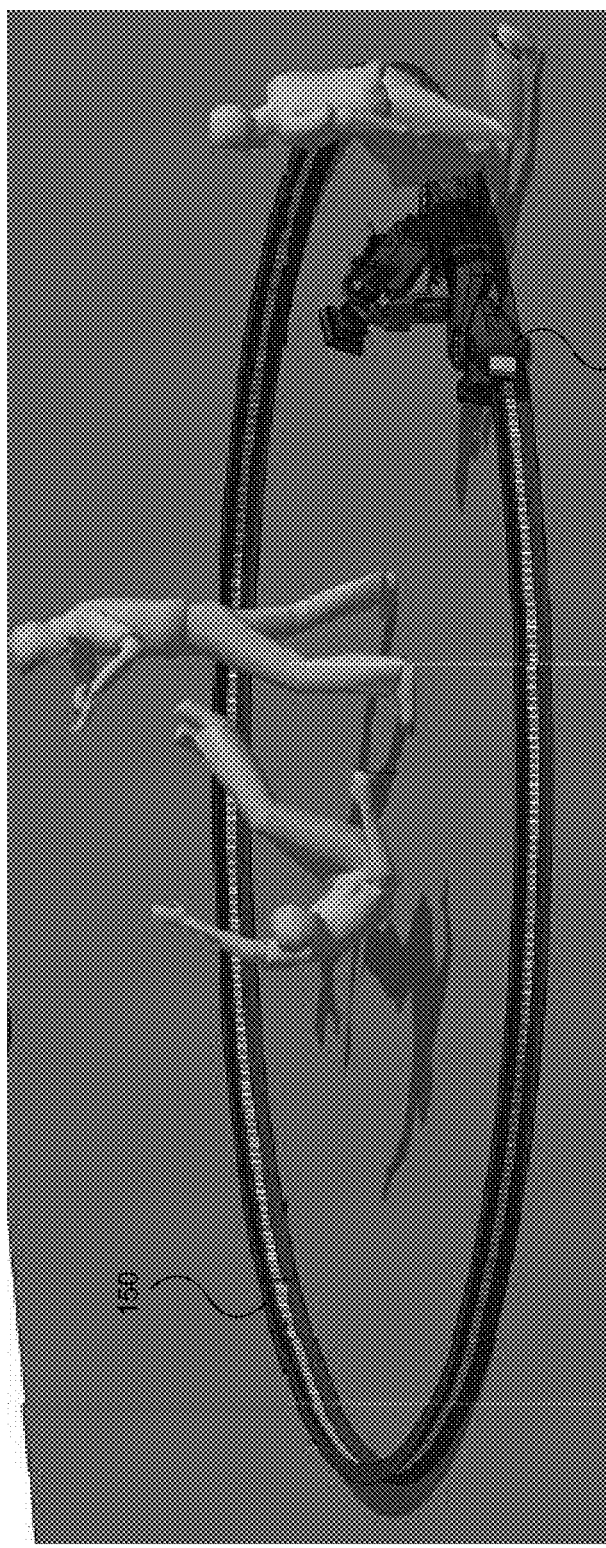
FIG. 6 illustrates an example track configuration according to one embodiment.
Figure 7:
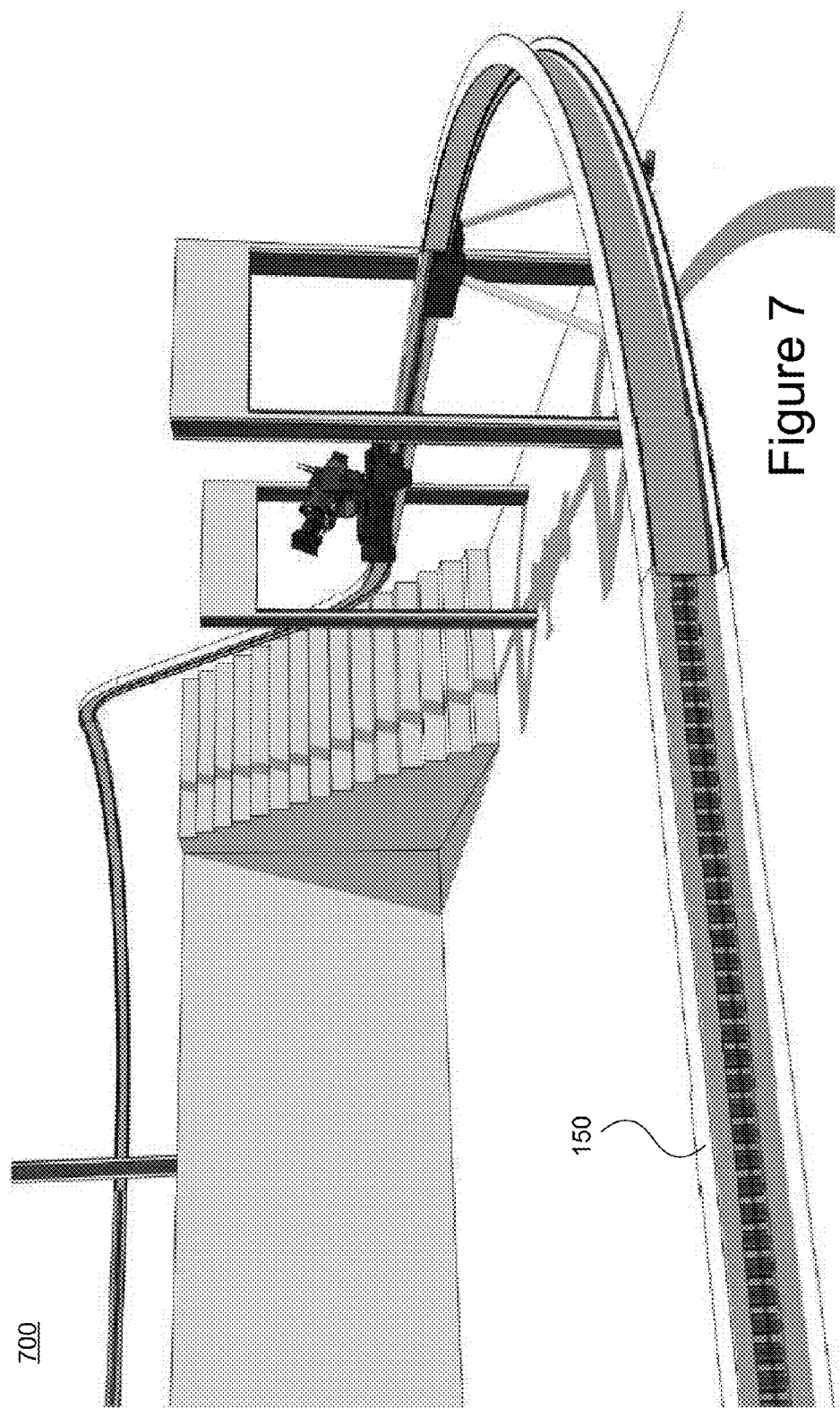
FIG. 7 illustrates another example track configuration according to one embodiment.
Figure 8:
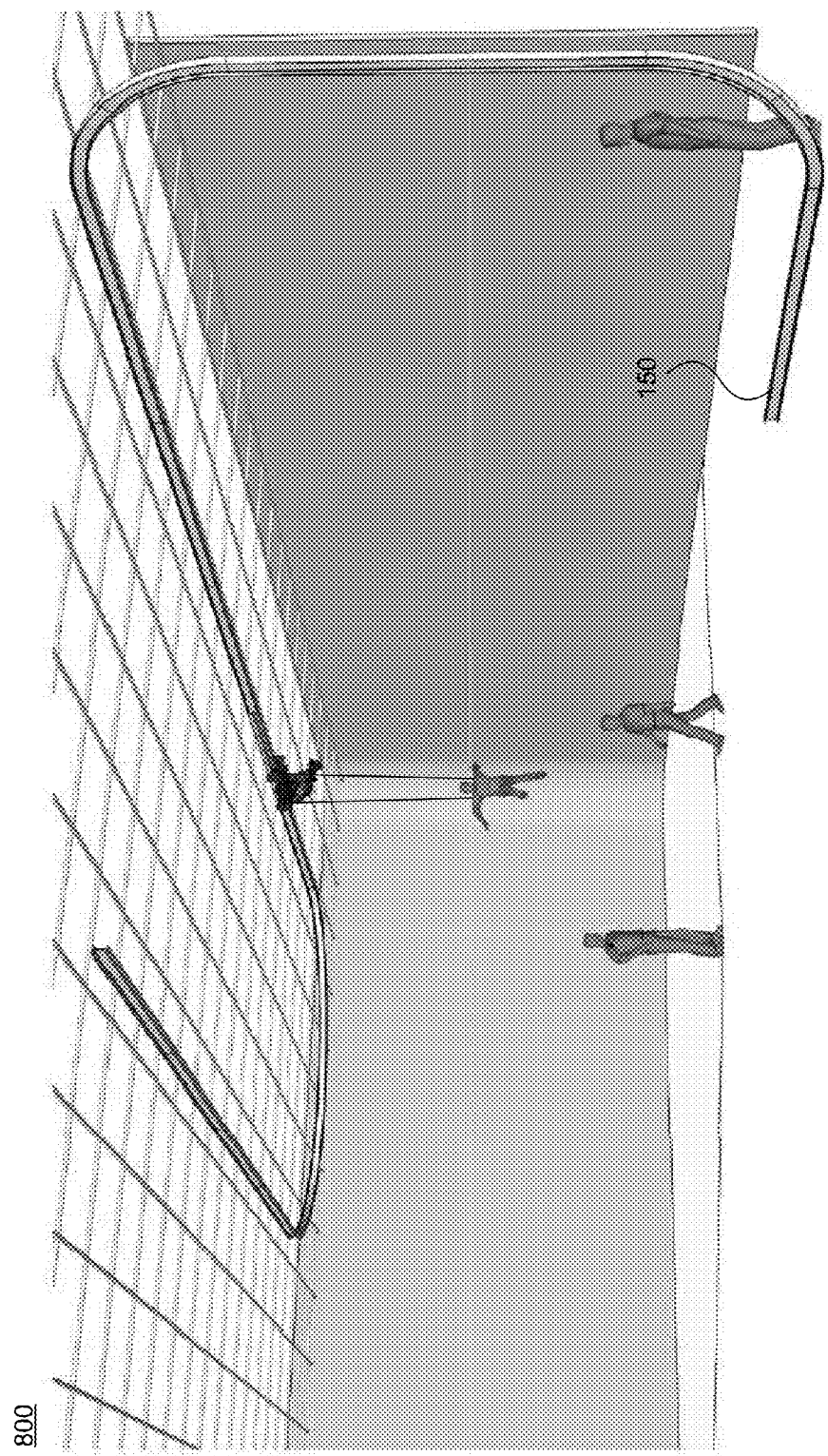
FIG. 8 illustrates another example track configuration according to one embodiment.
Figures 9A, 9B:
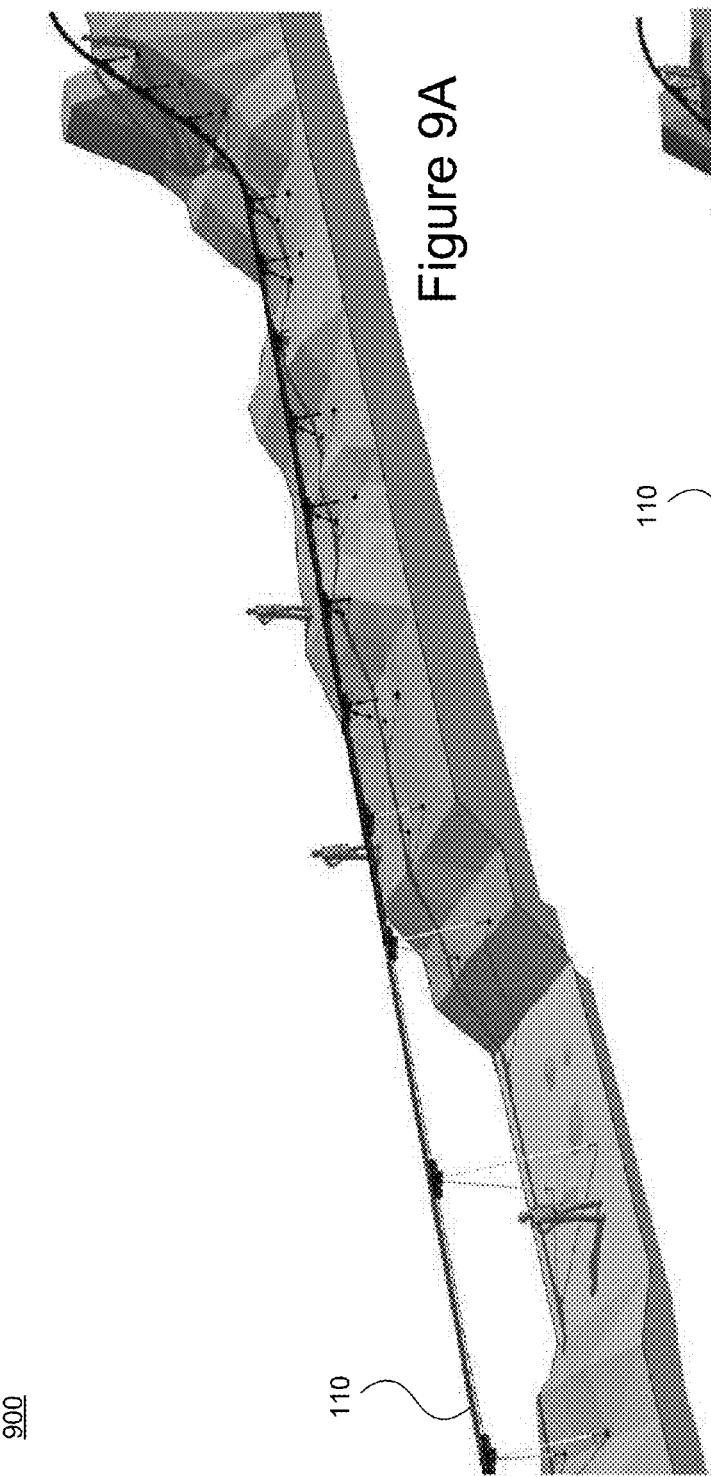
FIGS. 9A-B illustrate another example track configuration according to one embodiment.
Figure 10:
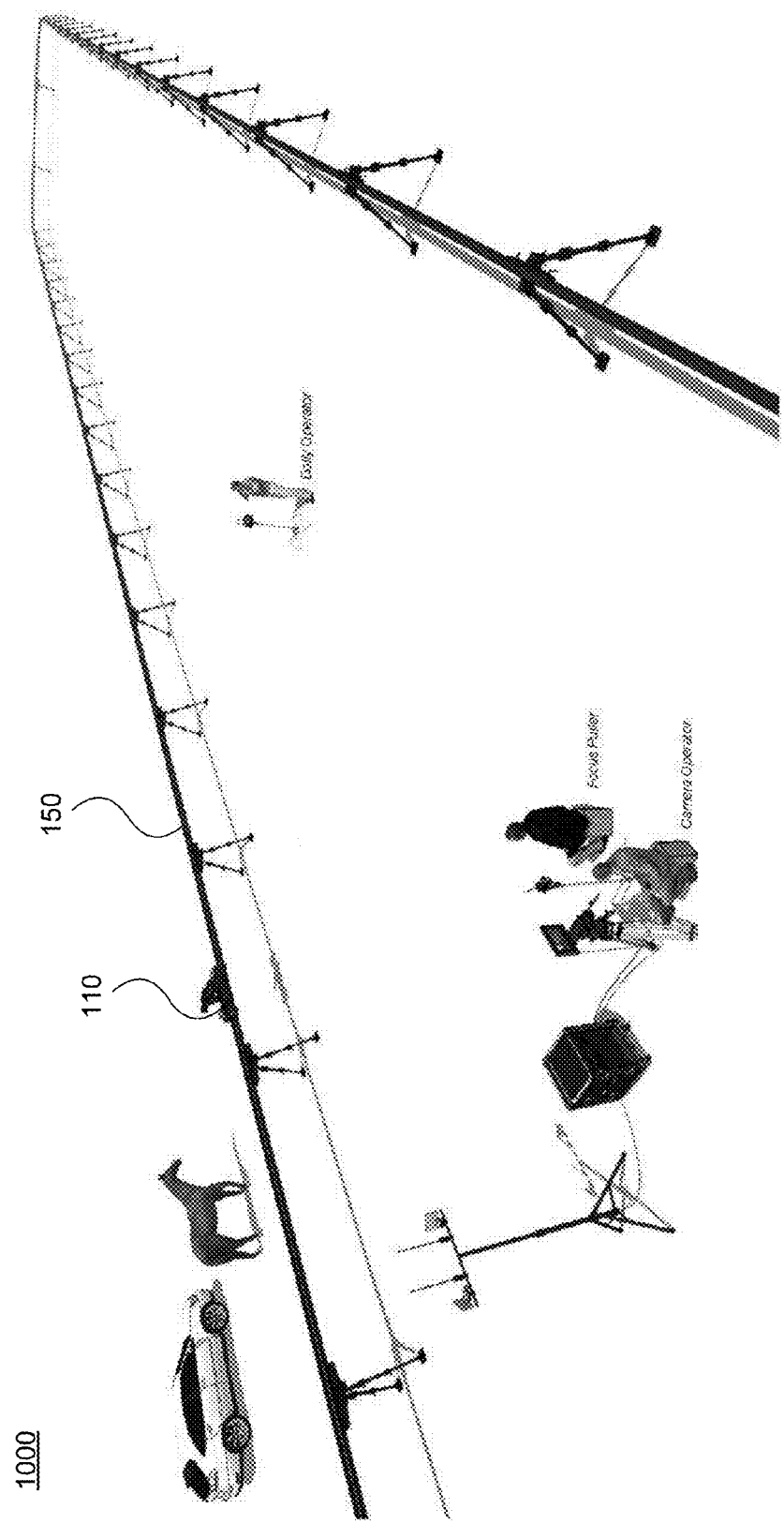
FIG. 10 illustrates another example track configuration according to one embodiment.

A variety of track sections and connections contribute to the versatility of the dolly system 100 and the variety of possible track configurations. FIGS. 6-10 illustrate some examples of various track configurations 600, 700, 800, 900, 1000 according to at least one embodiment. FIG. 6 illustrates an example of a closed loop configuration 600. As discussed below, in some embodiments, the dolly 110 may beneficially be controlled without dragging cables (e.g. wirelessly, semi-autonomously or fully autonomously), which eliminates the dangers caused by dragging cords or running them over as the dolly navigates the loop. FIG. 7 illustrates another example configuration 700 in which the track 150 and dolly 110 pass through conventional hallways, doorways and navigate stairs in some embodiments. FIG. 8 illustrates another example track configuration 800. FIG. 8 illustrates that, in some embodiments, a person and a camera may be attached to the dolly 110. In some embodiments, the dolly may traverse a track 150 in the over slung or under slung configuration, transition between the two and navigate (and stop on) vertical sections of track 150. FIGS. 9A and 9B illustrate different views of an example track configuration 900, which illustrates the dolly system's ability to be set up over rough terrain and span gaps and valleys. FIG. 10 illustrates example track configuration 1000, which is similar to a racetrack oval. In some embodiments, the dolly 110 is capable of high speed and acceleration and may, in some circumstances, be used instead of a chase car in the filming industry.

The dolly 110 may be controlled using a variety of methods depending on the embodiment. For example, in one embodiment, the dolly 110 may be controlled by a preprogrammed autonomous routine (free from direct human control and responding to sensor inputs), the dolly 110 may be controlled using an autonomous routine and user input (e.g. based on a previously recorded operation of the dolly and real-time user input), using a remote control (e.g. a handheld RF wireless remote), using a computer interface (e.g. a laptop or other computer device running various software programs such as a motion control program or software controlling an automation system within an industrial or factory setting), manually (e.g. pushed and pulled by a user) and manually with power assist (e.g. user pushes and pulls on dolly 110 and motors engage to aide movement of the dolly 110 in direction(s) pushed and pulled).

Figure 11B:
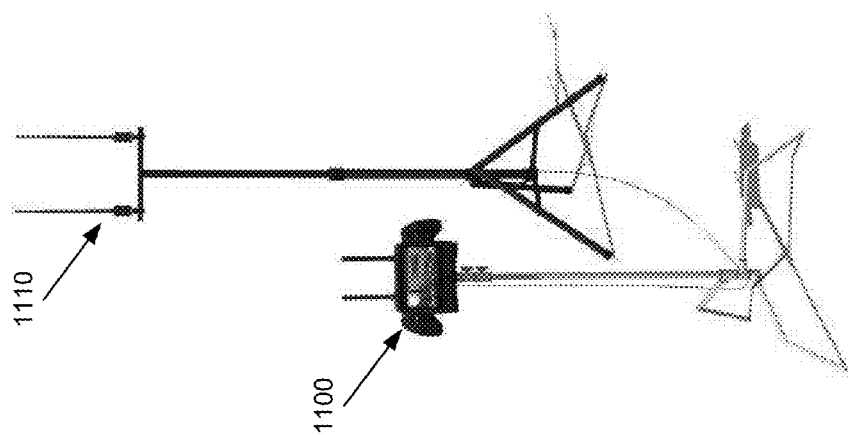
FIGS. 11A-11E illustrate examples of various controllers and control configurations according to some embodiments.
Figure 11A:
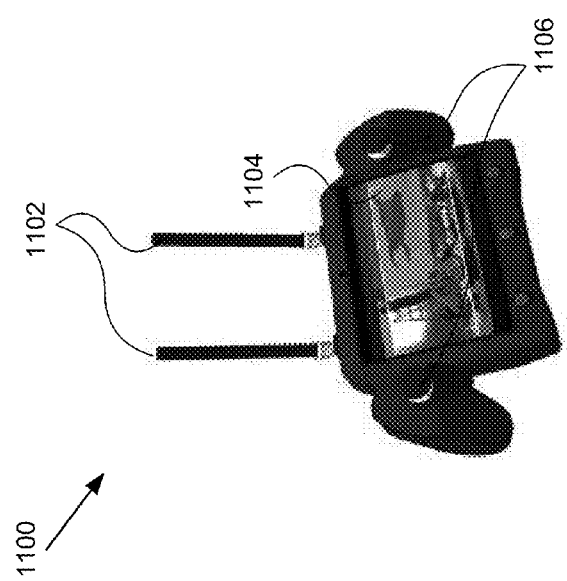
Figure 11D:
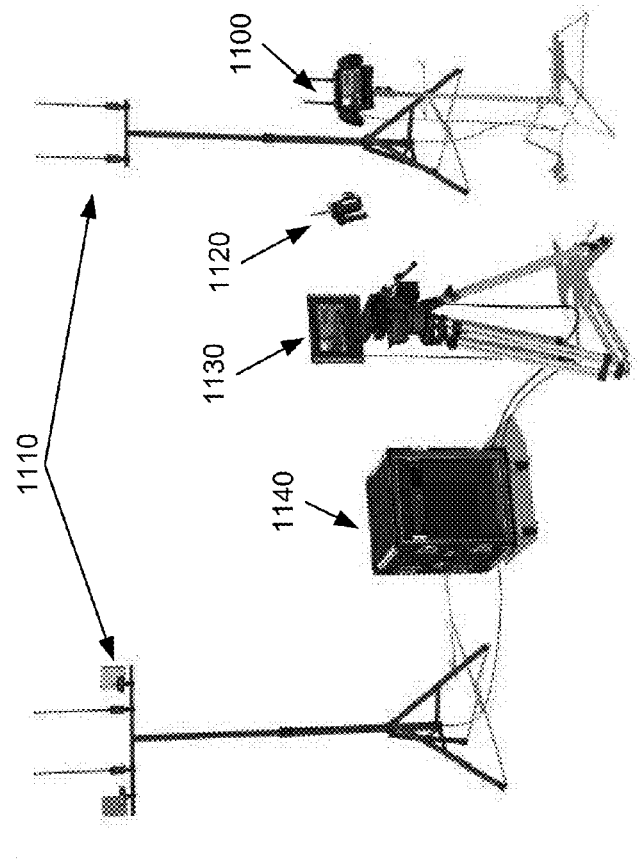
Figure 11C:
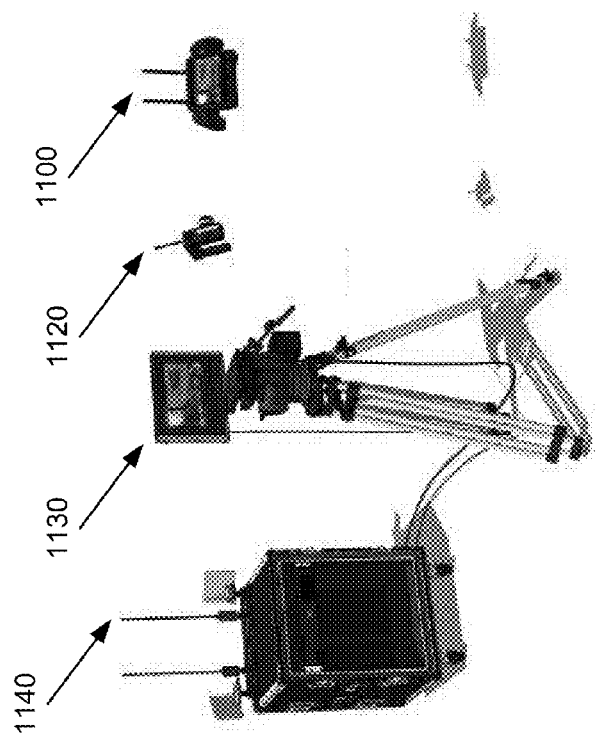
Figure 11E:
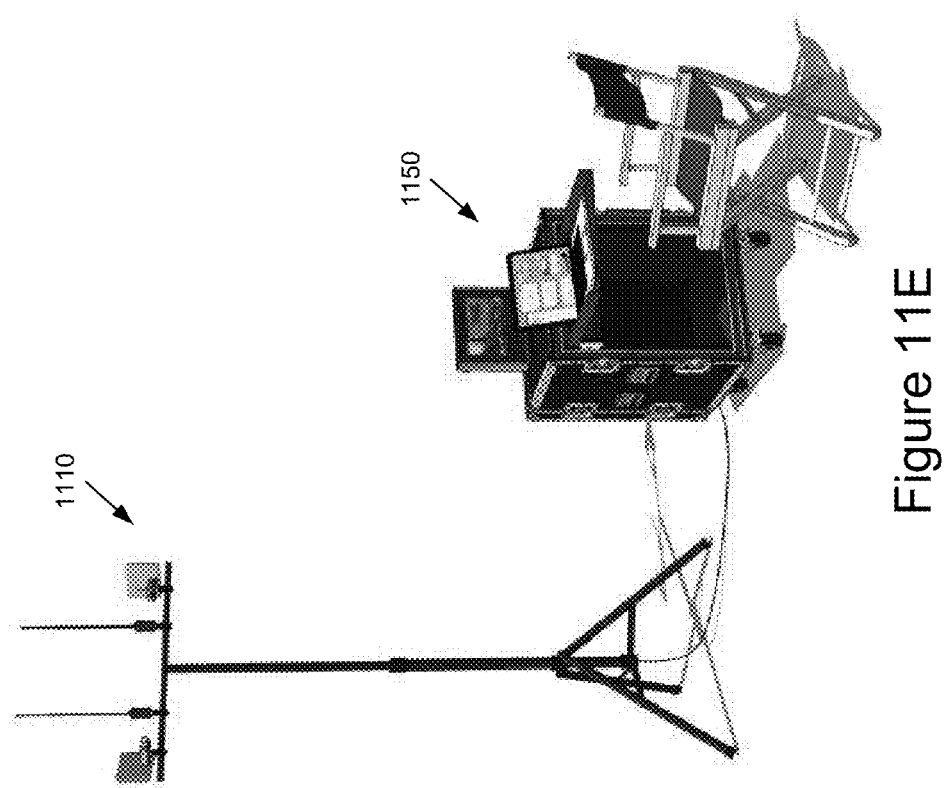

FIGS. 11A-E illustrate various examples of controllers and control configurations according to some embodiments. FIG. 11A illustrates a dolly controller 1100 according to one embodiment. In the illustrated embodiment, the dolly controller 1100 includes antennae 1102, a screen 1104 and controls 1106 (e.g. joysticks, which may include a deadman's switch). FIG. 11B illustrates a dolly controller with a range extending antenna mast according to one embodiment. FIG. 11C illustrates a dolly controller 1100, a focus, iris and zoom controller 1120, a pan-bar controller 1130 in a "wheels" configuration and a base station 1140 according to one embodiment. FIG. 11D is similar to FIG. 11C, but with range extending antenna masts 1110 coupled to each of the dolly controller 1100 and base station 1140. FIG. 11E illustrates an example motion control set-up according to one embodiment. In the illustrated embodiment, the motion control set-up includes a range extending antenna mast 1110 coupled to a computing device 1150 (e.g. a laptop or other computing device) running motion control software (e.g. "key frame" and "curve editing" styled software). The range of the dolly's wireless control may depend upon environmental conditions, RF technology and antenna used. For example, in some embodiments, the RF technology and antenna are similar to that used by the military in devices such as surveillance drones and may have a range of hundreds or thousands of meters. In other embodiments, different antenna and RF technology may be used and the range may be more limited.

Figure 12:
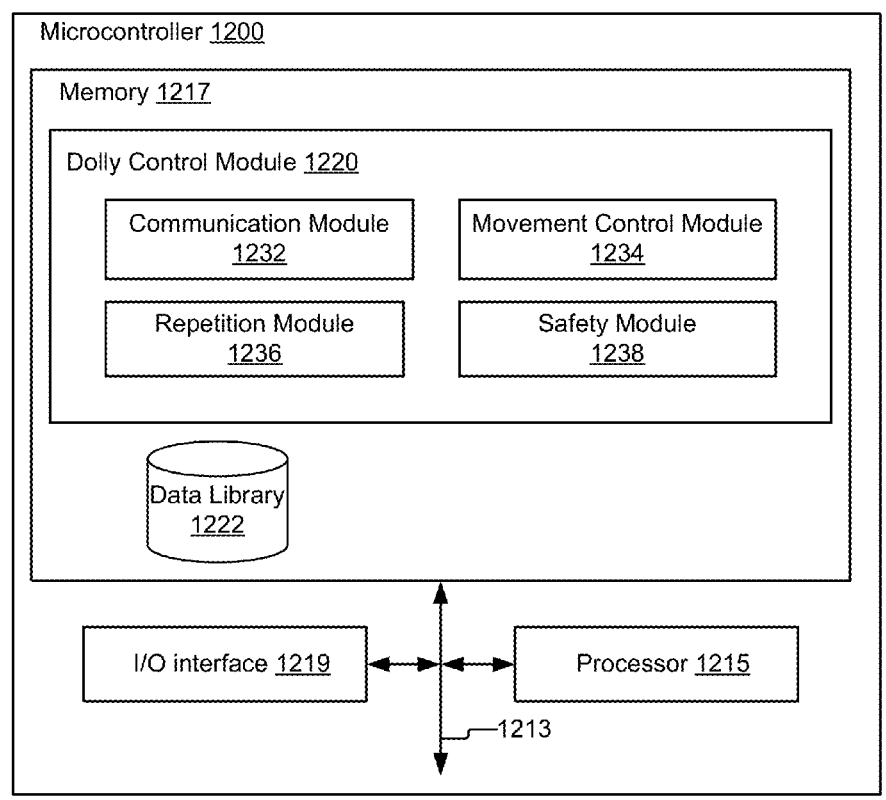
FIG. 12 is a block diagram of an example of a microcontroller according to one embodiment.

FIG. 12 is a block diagram of an example of a microcontroller 1200 according to one embodiment. In one embodiment, the microcontroller 1200 is a computing device included on the dolly 110 and controls the operation of the dolly. As used herein, the "operation" of the dolly 110 may include the movement of the dolly along the track 150 and, optionally, the operation of devices associated with the dolly (e.g. camera 130 and its multi-axis head, a switched output controlling a bloop light, a camera boom, etc.)

The microcontroller 1200, as illustrated, may include a processor 1215, a memory 1217 and an I/O interface 1219, which may be communicatively coupled by a communications bus 1213. The microcontroller 1200 depicted in FIG. 2 is provided by way of example and it should be understood that it may take other forms and include additional or fewer components and the functionality of the microcontroller may be divided among multiple components without departing from the scope of the present disclosure. For example, the appendices include a "dolly chassis electrical connectivity" diagram and description, in which the dolly 110 includes different components but provides functionality similar to that described herein.

The processor 1215 may execute code, routines and software instructions by performing various input/output, logical, and/or mathematical operations. The processor 1215 have various computing architectures to process data signals including, for example, a complex instruction set computer (CISC) architecture, a reduced instruction set computer (RISC) architecture, and/or an architecture implementing a combination of instruction sets. The processor 1215 may be physical and/or virtual, and may include a single core or plurality of processing units and/or cores. In some implementations, the processor 1215 may be coupled to the memory 1217 via the bus 1213 to access data and instructions therefrom and store data therein. The bus 1213 may couple the processor 1215 to the other components of the microcontroller 1200 including, for example, the memory 1217 and I/O interface 1219.

The memory 1217 may store and provide access to data to the other components of the microcontroller 1200. In some implementations, the memory 1217 may store instructions and/or data that may be executed by the processor 1215. For example, as depicted, the memory 1217 may store the dolly control module 1220 according to one embodiment. The memory 1217 is also capable of storing other instructions and data, including, for example, an operating system, hardware drivers, other software applications, databases, etc. The memory 1217 may be coupled to the bus 1213 for communication with the processor 1215 and the other components of the microcontroller 1200. In one embodiment, the memory stores the dolly control module 1220 and the data library 1222.

The dolly control module 1220 includes instructions and routines for one or more semi-autonomously controlling the operation of the dolly 110, repeating previous operations of the dolly 110 and safely operating the dolly 110. The dolly control module 1220 and its functionality are discussed further below, for example, with reference to FIGS. 13-16.

The data library 1222 includes data and information for use by the dolly control module 1220 and its sub-modules. In one embodiment, the data library 1222 includes a track library. For example, a data base including information about the various track sections and characteristics associated with each (e.g. range of track indicators, safety parameters, safety scanner zones to monitor when approaching, etc.). In one embodiment, the data library 1222 includes an experimentally derived load test data. For example, a table from which the dolly 110 may interpolate, extrapolate or match the results of a load test performed with the dolly's present payload and determine anticipated behavior of the dolly's present payload and appropriate safety parameters to impose based on that determination. In one embodiment, the data library 1222 includes safety parameters, for example, preprogrammed safety parameters such as a global maximum speed, maximum total torque allowed to be exerted by payload, maximum wheel temperatures, etc. In one embodiment, the data library 1222 includes safety notification identifiers and associated safety protocols and control signals.

The memory 1217 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 1215. In some implementations, the memory 1217 may include one or more of volatile memory and non-volatile memory. For example, the memory 1217 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 1217 may be a single device or may include multiple types of devices and configurations.

The bus 1213 can include a communication bus for transferring data between components of the microcontroller 1200. In some implementations, one or more of the I/O interface 1219, dolly control module 1220, its sub-components 1232, 1234, 1236, 1238, the data library 1222 and various other software operating on the microcontroller 1200 (e.g., an operating system, device drivers, etc.) may cooperate and communicate via a software communication mechanism implemented in association with the bus 1213. The software communication mechanism can include and/or facilitate communication among and between the various components of the microcontroller 1200.

The I/O interface 1219 may include one or more interface devices (I/F) for wired and/or wireless connectivity with other components of the dolly 110 (e.g. sensors, motors, switched outputs, inputs, etc.) and other devices. Examples of other devices include, but are not limited to a camera 130 and its multi-axis head 140, controller(s) 1100, 1120, 1130, a triggering device (e.g. a photoelectric switch for triggering the dolly 110 to repeat an operation when an event is detected), a sync signal generator for generating a signal to synchronize the operation of the dolly 110 and it associated devices, etc. For instance, the I/O interface 1219 may include, but is not limited to, CAT-type interfaces, CANopen, wireless transceivers for sending and receiving signals using radio transceivers (e.g. MIMO, COFDM, 4G, 3G, 2G, Wi-Fi™, Bluetooth®, NFC, etc.), USB interfaces, various combinations thereof, etc.

The dolly 110 includes one or more sensors. Examples of sensors include, but are not limited to, a track indicator sensor (e.g. one or more barcode readers), a scanner (e.g. one or more of a laser safety scanner and a laser distance scanner), a load sensor (e.g. load washer or strain gauge), a temperature sensor (e.g. for measuring wheel temperature), an inclinometer (e.g. an inertial measurement unit ("IMU") for measuring inclines and determining a virtual horizon), a motor encoder (e.g. for measuring revolutions of the motor and/or wheels), an open hatch sensor, etc. In one embodiment, the I/O interface 1219 provides an interface for the dolly control module 1220 and its sub-modules 1232, 1234, 1236, 1238 to receive sensor data and output signals to control the operation of the dolly (e.g. throttle/brake the motor) and/or an associated device (e.g. pan the camera 130).

In some embodiments, a storage device (not shown) may also be included. A storage device is an information source for storing and providing access to data. In some implementations, the storage device may be coupled to the components 1215, 1217, 1219 of the microcontroller via the bus 1213 to receive and provide access to data. The storage device (not shown) can include one or more non-transitory computer-readable mediums for storing the data. In some implementations, the storage device may be incorporated with the memory 1217 or may be distinct therefrom.

A module, such as those illustrated in FIGS. 12-16, may include code and routines. In one embodiment, a module is a set of instructions executable by the processor 1215. In another embodiment, a module is stored in the memory 1217 and is accessible and executable by the processor 1215. Regardless, the module is adapted for cooperation and communication with the processor 1215, other components of the microcontroller 1200 and other components of the dolly 110 (e.g. sensors, motors, RF transceiver, etc. depending on the module and embodiment). Referring again to FIG. 12, in one embodiment, the dolly control module 1220 includes a communication module 1232, a movement control module 1234, a repetition module 1236 and a safety module 1238.

In one embodiment, the communication module 1232 handles communications between the modules 1234, 1236, 1238, their sub-modules (shown in FIGS. 13-16) and devices coupled to the microcontroller via I/O interface 1219. For example, assume the I/O interface is coupled to a barcode reader 302; in one embodiment, the communication module 1232 receives the barcodes detected, or "read," by the barcode reader via the I/O interface 1219 and passes the barcodes to the repetition module 1236. In another example, the communication module 1232 receives control signals from the repetition module 1236 and passes the control signals to the movement control module 1234, which throttles down and/or brakes the dolly 110 based on the control signals received from the repetition module 1236 to reproduce a previously executed dolly 110 movement. For clarity and convenience, mention of the communication module 1232 may occasionally be omitted. For example, the above scenarios may be described as the repetition module 1236 receiving barcodes (i.e. track indicators) from the barcode reader 302 (i.e. track indicator sensor) and as the movement control module 1234 receiving control signals from the repetition module 1236, respectively.

The movement control module 1234, which is described further below with reference to FIG. 13, controls the movement of the dolly 110 along the track 150 based on one or more control signals. In some embodiments, the dolly 110 may be controlled in various ways and thus the control signals may have one or more sources. For example, in some embodiments, the dolly 110 may be controlled by one or more of a user and at least semi-autonomously.

In some embodiments, a user may control the dolly 110 in one or more ways. Examples of control signals based on user input include, but are not limited to, signals from a controller, laptop or control console whether received wirelessly or through a wire, manual control with power assist, etc. For example, in one embodiment, the user may provide control signals by using a wireless controller and user inputs on the remote control (e.g. operation of a joystick) are received by the movement control module 1234 as control signals. In another example, the dolly 110 may include handles (not shown) that a user may hold onto and when the user pushes or pulls on the handles the dolly 110 initiates one or more of the dolly's motors to assist the user in moving the dolly 110 in the direction pushed or pulled, which is occasionally referred to herein as "manual control with power assist." It should be noted that in some embodiments, the dolly 110 may be operated manually, i.e., a user may manually push or pull the dolly 110 along the track, and the movement control module 1234 does not necessarily receive any control signals during such operation.

In some embodiments, the dolly 110 is controlled based at least in part on control signals generated at least semi-autonomously. Depending on the embodiment, semi-autonomous (or fully autonomous) control signals may include, but are not limited to, control signals for repetition, or "playback," of a previously executed movement, control signals coordinating movement of multiple dollies (e.g. inter-dolly control signals), control signals automatically initiating safety overrides, etc.

In some embodiments, the movement control module 1234 controls the movement and operation of a device mounted to the dolly 110 based on one or more control signals. For example, in one embodiment, the movement control module 1234 may operate the camera 130 on the dolly 110, e.g., panning, focusing and zooming the camera while the dolly 110 moves. In another example, in one embodiment, the movement control module 1234 operates the camera 130 on the dolly 110 and the dolly 110 to repeat a previous operation of the dolly 110 including the movement of the dolly 110 along the track and the camera's recording, pan, tilt, lens, and zoom from a previous shot.

The movement control module 1234 passes a movement control signal to the associated component(s) of the dolly. For example, assume the movement control signal is to slow or stop the movement of the dolly 110 along the track; in one embodiment, the movement control module 1234 outputs a movement control signal to the motor amp(s) driving the dolly to slow or stop driving the wheels or to lock the drive shaft. In another example, assume the control signal is to change the zoom on the camera 130; in one embodiment, the movement control module 1234 outputs a movement to a lens control interface, motor, solenoid or other mechanism for changing the zoom.

The repetition module 1236, which is described further below with reference to FIG. 14, repeats, or plays back, a previous operation of the dolly 110. Depending on the embodiment, the previous operation of the dolly 110 may include, but is not limited to, one or more of the movement of the dolly 110 on the track, a movement of a device mounted to the dolly 110 (e.g. panning, tilting, focusing, zooming a camera 130, operating a boom, etc.) and other operations (e.g. operating a camera light or bloop light, which may be attached to and controlled via the dolly 110).

In one embodiment, the repetition module 1236 passes a playback control signal to the movement control signal. In one embodiment, the repetition module 1236 stores the playback control signal in the memory 1217 (or any other non-transitory storage medium communicatively accessible, e.g., a storage device), and the other modules of the dolly control module 1220 including, e.g., the movement control module 1234, can retrieve the playback control signal by accessing the memory 1217 (or other non-transitory storage medium).

In some embodiments, the system 100 may include one or more safety features. In some embodiments, the safety features include one or more safety features that may automatically control the operation of the dolly 110 including, for example, its movement along the track 150. For example, safety features may include one or more of slowing near the end of the track, stopping before the end of the track (e.g. regardless of user input), determining and obeying safe speed limits along the track (e.g. not entering turn 1 at a speed greater than X), collision avoidance, detecting breaks in the track or continuity of the barcode (i.e. track integrity), not operating when deadman's switch is not being held on a controller 1100, not moving when a maintenance hatch is open on the dolly 110 or a charging cable is connected, etc. In some embodiments, one or more safety features are enabled at least in part by the dolly 110 generating a virtual model of the track's layout, determining safe operating parameters based on that layout, monitoring the dolly's operation to ensure that the dolly 110 is operating within the determined parameters and, in the event that the dolly 110 is not, sending one or more control signals to bring the dolly's operation back within the determined parameters. In one embodiment, the aforementioned safety features are performed at least in part by the safety module 1238, which is described further below with reference to FIG. 15. A control signal sent by the safety module 1238 may occasionally be referred to herein as a "safety override control signal."

In one embodiment, the safety module 1238 passes a safety override control signal to the movement control module 1234. In one embodiment, the safety module 1238 stores the safety override control signal in the memory 1217 (or any other non-transitory storage medium communicatively accessible, e.g., a storage device). The other modules of the dolly control module 1220 including, e.g., the movement control module 1234, can retrieve the safety override control signal by accessing the memory 1217 (or other non-transitory storage medium).

Figure 13:
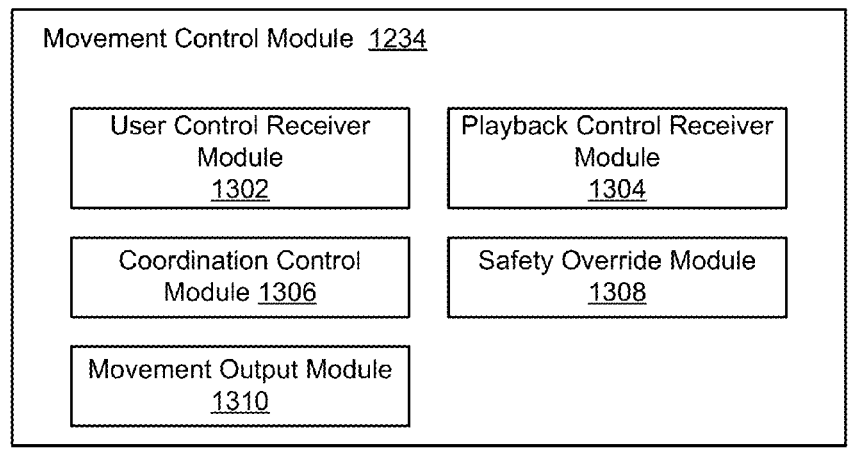
FIG. 13 is a block diagram of an example of a movement control module according to one embodiment.

Referring to FIG. 13, an example of the movement control module 1234 is shown in detail according to one embodiment. In the illustrated embodiment, the movement control module 1234 includes a user control receiver module 1302, a playback control receiver module 1304, a real-time automated control module 1306, a safety override module 1308 and a movement output module 1310.

The user control receiver module 1302 receives control signals resulting from user input. In some embodiments, the user input may be real-time or near real time. For example, the user control receiver module 1302 (e.g. via the I/O interface 1219 and an RF transceiver and antenna on the dolly 110) receives control signals from a controller (e.g. controller 1100) operated by the user. In another example, the user control receiver module 1302 (e.g. via the I/O interface 1219 and a sensor associated with a handle on the dolly 110) receives control signals resulting from the user pushing or pulling on the dolly's handle (not shown).

In some embodiments, the user input may not be in real-time. For example, assume the user creates a motion control plan (e.g. a control plan that represents at position A on track 150 accelerate dolly 110 to rate 1, at position B adjust camera to configuration i and begin panning camera 130 to configuration ii at rate 2, etc.) on the user's laptop; in one embodiment, the user control receiver module 1302 (e.g. via the I/O interface 1219 and a connection whether wireless, such as Wi-Fi, or wired such as USB, Ethernet etc.) receives control signals associated with the plan (or the plan itself) from the user's laptop.

In one embodiment, the user control receiver module 1302 passes the received control signals to the movement output module 1310. In one embodiment, the user control receiver module 1302 stores the received control signals in the memory 1217 (or any other non-transitory storage medium communicatively accessible, e.g., a storage device). The other modules of the dolly control module 1220 including, e.g., the movement output module 1310, can retrieve the received control signals by accessing the memory 1217 (or other non-transitory storage medium).

The playback control receiver module 1304 receives control signals from the repetition module 1236 for repeating a previous operation of the dolly 110 and, in some embodiments, devices associated with the dolly 110. The repetition module 1236 is discussed in greater detail below with reference to FIG. 14.

In one embodiment, the playback control receiver module 1304 passes the received control signals to the movement output module 1310. In one embodiment, the playback control receiver module 1304 stores the received control signals in the memory 1217 (or any other non-transitory storage medium communicatively accessible, e.g., a storage device). The other modules of the dolly control module 1220 including, e.g., the movement output module 1310, can retrieve the received control signals by accessing the memory 1217 (or other non-transitory storage medium).

The coordination control module 1306 receives control signals for coordinating the dolly's movement with one or more other dollies. In some embodiments, multiple dollies may be networked and coordinate between one another. For example, assume multiple dollies each having a camera 130 are covering an American football game; in one embodiment, the dollies and their cameras may autonomously coordinate so that one automatically tracks the ball and its movement another automatically tracks the movement of the quarterback and another automatically positions itself to look up or down field depending on its position and to not collide with one another when on the same track and (if on the same track) trade tracking assignments as necessary.

In one embodiment, the coordination control module 1306 passes the received control signals to the movement output module 1310. In one embodiment, the coordination control module 1306 stores the received control signals in the memory 1217 (or any other non-transitory storage medium communicatively accessible, e.g., a storage device). The other modules of the dolly control module 1220 including, e.g., the movement output module 1310, can retrieve the received control signals by accessing the memory 1217 (or other non-transitory storage medium).

The safety override module 1308 receives control signals from the safety module 1238, which is discussed below with reference to FIG. 15. In one embodiment, the control signals received from the safety module 1238 are based on one or more safety protocols.

In one embodiment, the safety override module 1308 passes the received control signals to the movement output module 1310. In one embodiment, the safety override module 1308 stores the received control signals in the memory 1217 (or any other non-transitory storage medium communicatively accessible, e.g., a storage device). The other modules of the dolly control module 1220 including, e.g., the movement output module 1310, can retrieve the received control signals by accessing the memory 1217 (or other non-transitory storage medium).

The movement output module 1310 receives control signals from one or more of the receiver modules 1302, 1304, 1306, 1308, and outputs a signal to the appropriate component(s) of the dolly 110, and in some embodiments, devices associated with the dolly 110 (e.g. camera 130 and camera head 140) based on the control signals. For example, a signal to a dolly 110 motor (not shown) to accelerate or decelerate using the throttle or brakes, a signal to a camera head to pan, a signal to the camera 130 to start or stop recording, a signal to a light to turn on or off, etc.

In one embodiment, the control signals have a hierarchy. For example, in one embodiment, safety is paramount and in the event the output module 1310 receives conflicting control signals from the safety override module 1308 (e.g. stop the dolly 110) and another module 1302, 1304, 1306 (e.g. accelerate the dolly 110), the movement output module 1310 outputs a signal based on the control signal from the safety override module 1308 (e.g. stop motors and lock drive shafts). In another example, control signals based on real-time user input may supersede control signals for repeating an operation allowing the user to modify playback of a repeated operation on-the-fly as desired. In some embodiments, different hierarchies for control signals may exist for different components being controlled. For example, for dolly 110 movement along track the hierarchy of control signals may by safety, coordination, user input (real-time), user input, movement playback, but the hierarchy of control signals for a camera 130 mounted on the dolly 110 may be safety, user input (real-time), user input, movement playback, coordination.

In some embodiments, at least a subset of control signals are filtered. The control signals filtered and the types of filtering applied may vary depending on the embodiment. Examples of filtering include, but are not limited to, one or more of, smoothing, electronic gearshift filtering, slewing, etc. In one embodiment, at least a subset of control signals are smoothed. For example, the control signals undergo artistic smoothing to produce more desirable motion curves according to one embodiment. In another example, in some embodiments, Kalman filtering is used when a dolly's position is reconciled during repetition of a previous dolly operation and smoothly operates (e.g. speed up or slow down) the dolly 110 to accurately reproduce a previous operation of the dolly 110.

In one embodiment, at least a subset of control signals undergo electronic gearshift filtering. For example, in one embodiment, the control signals such as those from a remote control are modified by a sensitivity setting which may be associated with an electronic gearshift (e.g. when learning a track layout, on a short track or on a curvy track an electronic gearshift filter applies a default, low gear ratio and on a known track, on a longer track or on a straighter track an electronic gearshift filter applies a default, higher gear ratio), which determines a sensitivity of a joystick on the remote control. In one embodiment, at least a subset of control signals are filtered for slewing. For example, when learning the track layout, in one embodiment, a control signal from a brief, push forward on a controller's joystick may be filtered and interpreted as a control signal to advance the dolly 110 forward one section of track. In some embodiments, other inputs received by the dolly 110 may be filtered, e.g., to reconcile the position of the dolly based on conflicting sensor data.

In some embodiments, the filter may be one or more of contextual, source based, etc. In some embodiments, a control signal may undergo contextual filtering. For example, assume a user via a controller presses a joystick all the way forward thereby generating a control signal; in one embodiment, the context of the system 100 is used to filter, or interpret, the appropriate output signal. For example, if that control signal is received on a previously modeled or "known," long, straight track, the control signal may be interpreted (e.g. by the controller, the user control receiver module 1302, the movement output module 1310 or another module) as a request for maximum acceleration up to the top (safe) speed of the dolly 110 using a high, maximum electronic gear ratio and the movement output module 1310 sends output signals to the dolly motors and gearshift to accelerate accordingly. However, if that control signal is received on a new or short track, which is being modeled or "learned," the control signal may be interpreted as a request to creep forward or slew the length of the next section of track.

In some embodiments, filtering may be source based. For example, assume users, as humans, are not able to provide as smooth and refined control signals as a machine; in some embodiments, real-time control signals from a user may require different filtering or a different degree of filtering than control signals from a machine source such as motion control software or the repetition module 1236. For example, in one embodiment, control signals received from user input are always and continuously smoothed while control signals from a machine source such as motion control software is not smoothed.

The type of filtering, degree of filtering and where along the control path (e.g. at a controller or at the dolly which module of the dolly 110 performs the filtering may vary depending on the embodiment. Regardless, the movement output module 1310 passes an output signal to a component of the dolly 110 (e.g. via the I/O interface 1219).

Figure 14:
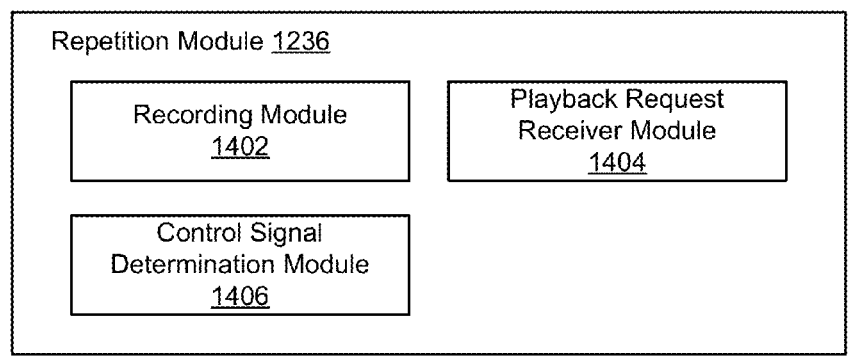
FIG. 14 is a block diagram an example of a repetition module according to one embodiment.

Referring to FIG. 14, an example of the repetition module 1236 is shown in detail according to one embodiment. The repetition module allows the repetition of a dolly's previous operation and, in some embodiments, the modification of a dolly's previous operation. For example, assume a user manually pushes the dolly and operates the dolly's associated camera 130 and the dolly's movement and the camera's pan, tilt, roll, focus, zoom was all as desired in take one, but an actor missed a queue and the scene needs to be reshot; in one embodiment, the repetition module 1236 generates the control signals automatically repeat the operation of the dolly 110 and associated devices (e.g. the camera 130, the camera's multi-axis head 140, a bloop light, a camera boom, etc.) in take one for the second take. In the illustrated embodiment, the repetition module 1236 includes a recording module 1402, a playback request module 1404, a control signal determination module 1406 and a control signal output module 1408.

In one embodiment, the repetition module 1236 performs automatic slating. In one embodiment, the repetition module 1236 performs automatic slating by associating a recorded operation of the dolly 110 with metadata. Examples of metadata associated with a recorded operation of the dolly 110 include, but are not limited to a time code or time stamp, parameters (e.g. safety parameters), layout of the track (e.g. a virtual model), notes (e.g. what scene or set the layout is associated with during filming), etc. It should be recognized that the preceding are merely examples of metadata and automatic slating and other examples exist.

The recording module 1402 records the operation of the dolly 110 and associated device(s). In one embodiment, the recording module 1402 records the operation of the dolly and associated devices using one or more channels. For example, in one embodiment, the recording module 1402 records a first channel associated with the dolly's movement along the track 150, a second channel associated with a boom (not shown), a third channel associated with a camera's pan, a fourth channel associated with a camera's tilt, a fifth channel associated with a camera's tilt, a sixth channel associated with a camera's roll, a seventh channel associated with a zoom of the camera's lens, an eighth channel associated with a focus of the camera's lens, a ninth channel associated with an iris of the camera 130, a tenth channel associated with a level/horizon of the camera 130, an eleventh channel associated with a switched output for another device (e.g. bloop light), etc. It should be recognized that the preceding are merely an example of the channels that may be recorded and that other channels exist and may be included. Furthermore, it will be recognized that the channel(s) recorded may vary depending on the embodiment, user preferences and the devices associated with the dolly 110.

In one embodiment, the recording module 1402 records a predetermined number of "moves" defining the operation of the dolly 110 or a device associated therewith. Depending on the embodiment, the predetermined number of moves may vary between channels or be consistent across channels.

The recording module 1402 may begin and end recording automatically, manually or using a combination thereof depending on the embodiment. In one embodiment, the recording module 1402 begins recording automatically. For example, in one embodiment, the recording module 1402 automatically begins recording the operation of the dolly 110 and associated devices when the dolly returns to the beginning of the track 150 and automatically stops recording when the dolly 110 reaches the end of the track 150. In some embodiments, after each run of the dolly 110 a user may be prompted to save that operation of the dolly or discard and, when discard is selected, the recording is overwritten when a subsequent operation of the dolly is performed. In one embodiment, the recording module 1402 begins and ends recording manually. For example, the recording module 1402 begins recording responsive to receiving user input to record (e.g. user selecting a "record" button on a dolly controller) and ends the recording responsive to the user selection to stop the recording). In some embodiments, a recorded operation is transferrable. For example, the recorded data may be stored to an external hard drive for long term storage or to transfer to another dolly 110 so the other dolly 110 may repeat the operation.

In one embodiment, the one or more channels may be recorded, or re-recorded individually. For example, assume the dolly 110 and camera 130 were previously operated and the dolly's movement and the pan, tilt, roll, iris and zoom of the camera were all satisfactory, but the shot was slightly out of focus. In one embodiment, a user may elect to keep the previously recorded data for the dolly's movement and the pan, tilt, roll, iris and zoom of the camera, and the repetition module 1236 will repeat those aspects of the previous operation and the user may record new data on the channel associated with camera focus. It will be recognized that the preceding are merely examples of the recording and rerecording a dolly's operation and other examples exist, for example, those discussed in the appendices.

In one embodiment, the recording module 1402 passes recorded data to one or more of the control signal determination module 1406 and an external device (e.g. a user's laptop or external hard drive). In one embodiment, the recording module 1402 stores the recorded data in the memory 1217 (or any other non-transitory storage medium communicatively accessible, e.g., a storage device). The other modules of the dolly control module 1220 including, e.g., the control signal determination module 1406, can retrieve the recorded data by accessing the memory 1217 (or other non-transitory storage medium).

The playback request receiver module 1404 receives a request to repeat, or playback, a previous operation of the dolly and, in some embodiments, associated devices. For example, the playback request receiver module 1404 receives a user input requesting the repetition and sends a request to the control signal determination module 1406 to generate one or more command signals for repeating the operation of the dolly and, depending on the embodiment, associated devices. In one embodiment, the playback request receiver module 1404 may determine whether the dolly 110 has sufficient battery power to complete the repetition request and sends a warning message to user if insufficient battery power remains. In one embodiment, the playback request receiver module 1404 moves the dolly 110 and, in some embodiments, the camera's pan, tilt, roll, iris, zoom, boom, etc. to an initial position for repeating the operation. Alternatively, in one embodiment, the control signal determination module 1406 may determine the control signals for moving the dolly (including its associated devices) into the initial position to begin repeating the requested move.

In one embodiment, the playback request receiver module 1404 passes the playback request to the control signal determination module 1406. In one embodiment, the playback request receiver module 1404 stores the playback request in the memory 1217 (or any other non-transitory storage medium communicatively accessible, e.g., a storage device). The other modules of the dolly control module 1220 including, e.g., the control signal determination module 1406, can retrieve the playback request by accessing the memory 1217 (or other non-transitory storage medium).

The control signal determination module 1406 determines one or more control signals for repeating a previously performed operation of the dolly 110 and, in some embodiments, devices associated therewith. In one embodiment, the control signal determination module 1406 receives data recorded on a first channel by the recording module 1402 (e.g. dolly position and time data) and generates a control signal in order to match the received data (e.g. generates throttle and braking control signals that are received by the movement output module 1310 and cause the dolly to create similar data, thereby repeating the recorded dolly operation).

In one embodiment, the control signal determination module 1406 utilizes sensor feedback to determine the control signal. For example, the control signal determination module 1406 receives live track indicator data in near real-time, compares the live track indicator data to the recorded data of the previous operation, determines whether to speed up, slow down, or hold speed and repeats the feedback process until the previous operation has been completely repeated.

The dolly's position on the track 150 is determined based on one or more sensors. When sensor data from a certain type of sensor is unavailable or data from two sensors conflict, sensor reconciliation is performed. Depending on the embodiment, the reconciliation may be performed by one or more modules. For example, with the position data from the track indicator sensor and motor encoders, the reconciliation may be performed by the recording module 1402 to record dolly position data 1402, the control signal determination module 1406 to determine the present position of the dolly on the track in order to compare to the previous operation and the position monitoring module 1602 for monitoring the dolly's position and by the safety module 1238 to determine whether to trigger a safety protocol) or performed by one module and shared with other modules. In one embodiment, position reconciliation is performed when the dolly 110 is operated at high speed. For example, assume the dolly 110 includes a track indicator sensor that is a high-speed barcode reader 302 and also includes a motor encoder that measures the revolutions per minute (RPM) of the drive wheels. Also assume that the dolly 110 accelerates to a speed too fast for the high-speed barcode reader to consistently read a barcode 302. In one embodiment, the dolly's position may be determined based on the last known position using the last barcode read and the revolutions of the driveshaft/motor/drive wheels since the last barcode was read. However, to approximate the dolly's position based on revolutions measured by a motor encoder a number of conditions must be assumed including, for example, known and constant wheel diameter and the absence of wheel slippage along the track. Because drive wheels may slip and the wheel size may vary (e.g. based on wear, thermal expansion, etc.) error is introduced, so the dolly's position when determined based on motor encoder data (i.e. revolutions data) may be said to be approximate. When the barcode reader 302 subsequently reads a barcode 152, the dolly's position is reconciled, i.e., updated to the position determined based on the barcode 152.

As mentioned above, the dolly's movements may be smoothed using filtering. This may beneficially reduce any jerkiness resulting from the reconciliation. For example, assume that upon reconciliation of the dolly's position it is determined that the dolly 110 is X units of measurement ahead/behind where it should be to accurately repeat a previous movement of the dolly 110 on the track 150. In one embodiment, Kalman filtering is used to determine the control signal to smoothly slow/accelerate the dolly 110 so that the dolly's operation becomes more consistent with the recorded dolly 110 operation.

In one embodiment, if an error in the recreation of an operation of the dolly 110 (e.g. an error in the movement of the dolly along the track, a positioning of the camera, etc.) exceeds a threshold the user is notified that the movement was not accurately repeated. Depending on the embodiment, the threshold for notifying the user may differ depending on the channel. In one embodiment, a notification is sent when the end position differs from that of the previously recorded operation by an amount that satisfies a threshold.

In one embodiment, the control signal determination module 1406 passes a control signal to the movement control module 1234 (e.g. the playback control receiver module 1304). In one embodiment, the control signal determination module 1406 stores the control signal in the memory 1217 (or any other non-transitory storage medium communicatively accessible, e.g., a storage device). The other modules of the dolly control module 1220 including, e.g., the playback control receiver module 1304, can retrieve the control signal by accessing the memory 1217 (or other non-transitory storage medium).

In some embodiments, a user may modify a previously recorded operation. For example, in one embodiment, a previously recorded operation, or a channel thereof, may be scaled so that when the move is repeated one or more of the operations takes more or less time (depending on the scaling) to complete, reversed to run in the opposite direction or otherwise modified. In some embodiments, a set of editing tools for modifying a previously recorded operation are available on the controller 1100. For example, in one embodiment, a user may interact with the touchscreen 1104 of the controller 1100 in order to scale, reverse or overwrite one or more channels of a previous dolly operation. In some embodiments, a user using a laptop or computer interface (e.g. 1150 at the base station 1140) may have a larger or different set of editing tools. For example, in one embodiment, a user can programmatically edit moves with fine control using motion curve and motion keyframe editing software on the laptop 1150 of base station 1140.

Figure 15:
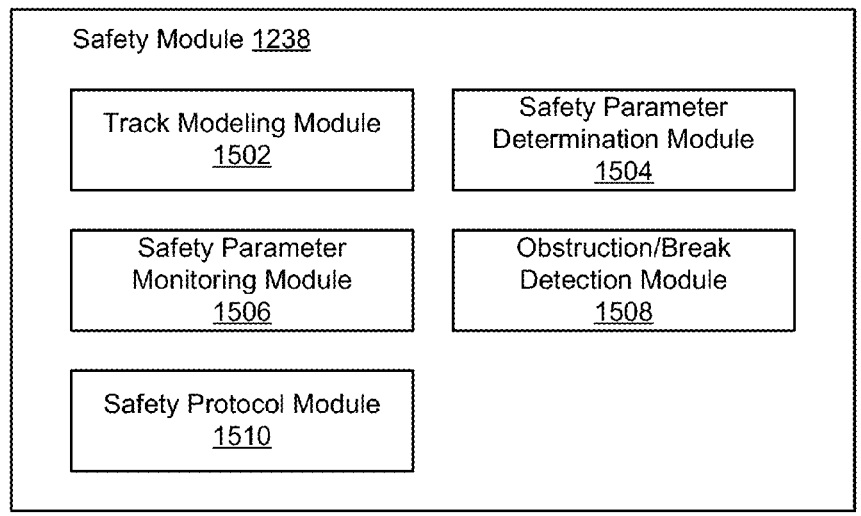
FIG. 15 is a block diagram of an example of a safety module according to one embodiment.

Referring to FIG. 15, an example of the safety module 1238 is shown in detail according to one embodiment. In the illustrated embodiment, the safety module 1238 includes a track modeling module 1502, a safety parameter determination module 1504, a safety parameter monitoring module 1506, an obstruction/break detection module 1508 and a safety protocol module 1510.

In some embodiments, the safety of the dolly's operation is enhanced by "knowing" the layout of the track and the dolly's position and speed on the track. For example, by "knowing" the layout of the track and the dolly's position and speed, the safety module 1238 can determine whether the dolly 110 is moving too quickly and should slow down because, for instance, the dolly is approaching a tight turn or the end of the track.

The track modeling module 1502 generates a virtual model of the layout of the track 150. Occasionally, generating the virtual model is referred to as "learning" the track configuration or similar and when the virtual model is complete the system 100 "knows" the layout of the track 150. Occasionally, the virtual model is referred to simply as the "model."

The virtual model is a virtual representation of the track's physical configuration. In one embodiment, virtual model is a mathematical model that is not intended for human use (e.g. the virtual model may not be human readable). However, in some embodiments, the track modeling module 1502 generates a 3D-model of the track's configuration for presentation to a human user. For example, the track modeling module 1502 generates a 3D model based on the virtual model.

In one embodiment, the track modeling module 1502 generates the virtual model at least in part by traversing the dolly across the track 150 and obtaining sensor data including track indicators as the dolly traverses the track. In some embodiments, the track modeling module 1502 obtains other sensor data in addition to the track indicators. For example, in one embodiment, the track modeling module 1502 receives inclinometer readings from an IMU sensor on the dolly.

In one embodiment, the track modeling module 1502 accesses the data library 1222 to determine the type of track section based on the obtained sensor data. For example, assume the track modeling module 1502 receives a first track indicator; in one embodiment, the track modeling module 1502 accesses the data library and determines that the first track indicator is associated with (e.g. falls in a range associated with) a straight piece of track of X length and modifies the virtual model to add the straight piece of track of X length to the virtual model. In one embodiment, the virtual model includes the sequence of all track indicators in the track 150 configuration, which may beneficially enable functionality such as an automatic stopping of the dolly 110 when an un-anticipated track indicator (i.e. an indicator that does not fit in the sequence associated with the virtual model) is detected during operation, since such a detection may indicate that the physical configuration of the track has been altered. In one embodiment, the track modeling module 1502 includes an inclinometer measurement with each section of track, or each position (e.g. with each track indicator) along the track.

Depending on the embodiment, the dolly 110 traverses across the track autonomously, semi-autonomously, or manually. In one embodiment, the track modeling module 1502 autonomously traverses the dolly across the track 150. For example, in one embodiment, when the dolly is placed on a newly configured track and receives a "learn track" request, the track modeling module 1502 moves the dolly 110 (by interacting with the movement control module 1234 according to one embodiment) along the track 150 from end-to-end at a slow rate of speed obtaining the track indicators and generating and updating the virtual model along the way.

In one embodiment, the track modeling module 1502 semi-autonomously traverses the dolly across the track 150. For example, in one embodiment, when the dolly is placed on a newly configured track and receives a command to move forward (e.g. user presses forward on controller 1100 joystick 1106), the track modeling module 1502 moves the dolly 110 (by interacting with the movement control module 1234 according to one embodiment) at a slow rate of speed forward one section of track while obtaining the track indicators and generating and updating the virtual model along the way. This is occasionally referred to as "slewing" along the track and beneficially allows the track modeling module 1502 to generate the virtual model in sections, for example, as the track 150 is being constructed and those sections are added to the layout.

In one embodiment, the dolly is manually traversed across the track. For example, the track modeling module 1502 receives a request to learn the track 150 and the user manually pushes/pulls the dolly 110 along the track, end-to-end or slewing in sections, and the track modeling module 1502 generates the virtual model. In one embodiment, whether the track modeling module 1502 traverses the dolly 110 across the track autonomously, semi-autonomously, or manually is based on a user preference or selection.

In one embodiment, the track system includes one or more end terminal track sections. In one embodiment, the dolly 110 automatically starts traversing in one direction until it detects an end terminal track section, whereupon it stops, then traverses in the opposite direction until it detects a second end terminal track section. In one embodiment, when the track modeling module 1502 reaches an end terminal track section, the virtual model is updated to reflect the end of the track. In some embodiments, the dolly 110 will not operate without detecting end terminals unless the track is configured in a loop.

In one embodiment, the track modeling module 1502 determines whether the track is configured in a loop. For example, in one embodiment, when the track modeling module 1502 detects a track indicator or sequence of track indicators that are already included in the virtual model, the track modeling module 1502 calculates the inclines, degrees turned, etc. to automatically determine whether the track is a loop and/or prompts the user to indicate whether the track is a loop and determines whether the track is a loop based on the user's response.

It should be recognized that the preceding are merely examples and other examples exist. For example, further description, examples, alternative embodiments, processes, interfaces, etc. of the virtual model, end terminals, etc. are included in the appendices and, therefore, are within the scope of this description.

In one embodiment, the track modeling module 1502 passes the virtual model to one or more of the safety parameter determination module 1504 and the safety parameter monitoring module 1506. In one embodiment, the track modeling module 1502 stores the virtual model in the memory 1217 (or any other non-transitory storage medium communicatively accessible, e.g., a storage device). The other modules of the dolly control module 1220 including, e.g., the one or more of the safety parameter determination module 1504 and the safety parameter monitoring module 1506, can retrieve the virtual model by accessing the memory 1217 (or other non-transitory storage medium).

The safety parameter determination module 1504 determines one or more safety parameters and associated thresholds. In one embodiment, a safety parameter threshold may include a threshold (e.g. a minimum, maximum value, or both defining a value range) or a condition (e.g. a Boolean true/false or I/O). For example, assume a safety parameter is a torque; in one embodiment, the safety parameter determines a maximum linear torque value and a maximum lateral (or centripetal) torque. In another example, assume a safety parameter is whether a hatch (not shown) on the dolly 110 is open or a charging cable (not shown) is plugged in; in one embodiment, the threshold is "True."

In one embodiment, one or more safety parameters and associated thresholds may be preprogrammed. In one embodiment, one or more of the preprogrammed safety parameters and their associated thresholds are independent of the track's configuration, the dolly's configuration or both. For example, a global maximum speed (i.e. a speed over which the dolly should not be operated regardless of how straight and long the track is and the dolly's position on the track, e.g., because of a risk of a component failure or premature component wear), a default, initial gear ratio or maximum gear ratio, a redline for maximum motor RPMs, a global maximum torque, whether a charging cable is plugged in, whether a hatch is open on the dolly 110, whether a break in the track exists, whether the track is obstructed, whether a maximum wheel temperature has been reached, whether a payload torque has been exceeded, etc. In one embodiment, the safety parameter determination module 1504 determines the preprogrammed safety parameters and associated thresholds by obtaining them from data library 1222.

In one embodiment, the safety parameter determination module 1504 determines one or more parameters and associated threshold(s) based on the track configuration using the virtual model. For example, the safety parameter determination module 1504 may determine a maximum speed based on the overall track length, the longest straightaway in the track, the direction of travel, etc. In one embodiment, the safety parameter determination module 1504 determines the dolly's control sensitivity and default electronic gearing (e.g. min or max gear ratio) based on the length or degree of curvature of the track using the virtual model.

In one embodiment, the safety parameter determination module 1504 determines one or more safety parameters that are conditional on sensor data and/or another safety parameter. For example, in one embodiment, the safety parameter determination module 1504 determines a safety parameter threshold (e.g. maximum speed) based on a track indicator (i.e. based on sensor data indicating a position on the track). Such an embodiment beneficially creates a safe "speed limit" for the dolly depending on the dolly's position and direction of travel and may avoid scenarios like entering a curve at too great a speed or approaching the end of the track at too great a speed. In another example, in one embodiment, the safety parameter determination module 1504 determines a safety parameter threshold (e.g. maximum and/or minimum speed) based on another safety parameter (e.g. a maximum wheel temperature). Such an embodiment may beneficially avoid damage to the wheel or dolly by not allowing the dolly to go at a speed that will heat the wheel further and/or not stop the dolly completely in order to avoid creating a flat spot on the wheel, or allow extrication of the dolly 110 from that section of track.

In one embodiment, the safety parameter determination module 1504 determines one or more safety parameters based on the dolly's configuration. For example, in one embodiment, the safety parameter determination module 1504 determines one or more safety parameters based on the dolly's payload and that payload's anticipated behavior.

In one embodiment, the safety parameter determination module 1504 determines the dolly's configuration experimentally, for example, by accelerating and decelerating the dolly according to a predetermined protocol and obtains sensor data (e.g. that from the load cells). In one embodiment, the safety parameter determination module 1504 uses the obtained sensor data and experimentally derived data (e.g. a table provided by the manufacturer) in the data library 1222 to determine (e.g. by extrapolation, interpolation or matching from the data library 1222) the anticipated behavior of the dolly's payload and determine, e.g., a maximum acceleration, deceleration based on the anticipated behavior (e.g. expected torque loads) of the dolly 110. In one embodiment, as the dolly 110 traverses the track at low speed during the learning process, the load (e.g. torques) are monitored and then extrapolated to determine one or more parameters (e.g. a speed limit in a curve in the track's layout).

In one embodiment, one or more of the safety parameters and their associated thresholds may be modifiable by a user. For example, a user may, using a user interface, view and modify the thresholds (e.g. to increase the maximum speed on a section of track). In some embodiments, modifying a safety parameter's threshold to be less conservative, will trigger a warning that such action may increase the risk of harm to persons and property, a liability waiver, a notice that the dolly's warranty will be invalidated, etc.

In one embodiment, the safety parameter determination module 1504 passes the thresholds to the safety parameter monitoring model 1506. In one embodiment, the safety parameter determination module 1504 stores the thresholds in the memory 1217 (or any other non-transitory storage medium communicatively accessible, e.g., a storage device). The other modules of the dolly control module 1220 including, e.g., the safety parameter monitoring model 1506, can retrieve the thresholds by accessing the memory 1217 (or other non-transitory storage medium).

The safety parameter monitoring model 1506 monitors sensor data associated with the safety parameters and determines whether the sensor data satisfies a threshold associated with a safety parameter. For example, the safety parameter monitors the dolly's position on the track (e.g. using sensor data from the track indicator sensor) and the dolly's speed and direction of travel (e.g. using sensor data from the motor encoder including the motor RPMs) to determine whether a speed threshold is satisfied.

Depending on the embodiment, the safety parameter monitoring model 1506 monitors sensor data continuously or periodically during the operation of the dolly 110. In one embodiment, the period for the periodic monitoring may vary from sensor to sensor (e.g. based on the sensor's sampling rate from the manufacturer or based on what the sensor monitors. For example, in one embodiment, the safety parameter monitoring model 1506 or sub-module thereof monitors the dolly's position on the track and the torque exerted by the dolly's load continuously or near continuously (e.g. using the maximum sampling rate of the track indicator sensor(s) and load sensor(s)), but the wheel temperature might be checked/monitored less frequently. In one embodiment, one or more of the parameters and associated threshold(s) are based on the dolly's position. For example, a given payload (e.g. torque measurement) or speed may not be excessive (i.e. does not satisfy a threshold) at one point in the track, but may be excessive (i.e. satisfies a threshold) at another.

Figure 16:
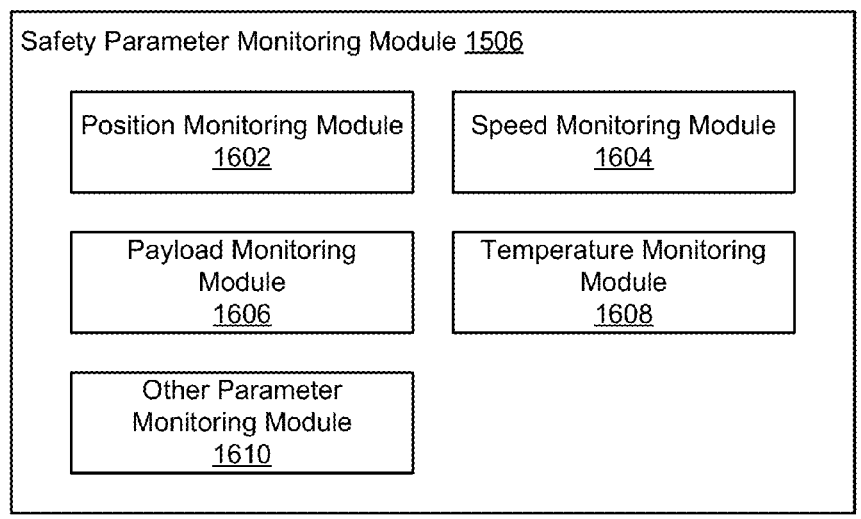
FIG. 16 is a block diagram of an example of a safety parameter monitoring module according to one embodiment.

Referring to FIG. 16, an example of the safety parameter monitoring module 1506 is shown in detail according to one embodiment. In the illustrated embodiment, the safety parameter monitoring module 1506 includes a position monitoring module 1602, a speed monitoring module 1604, a payload monitoring module 1606, a temperature monitoring module 1608 and an other parameter monitoring module 1610.

The position monitoring module 1602 monitors sensor data from one or more of the motor encoder and the track indicator sensor and determines the dolly's position on the track 150. In one embodiment, the position monitoring module 1602 shares the dolly's position with the speed monitoring module 1604. In one embodiment, the position monitoring module 1602 monitors whether track indicators are detected. For example, in one embodiment, if no track indicators are detected (e.g. they are absent, or a certain number in a row have been unreadable) the position monitoring module 1602 determines a threshold is satisfied. In one embodiment, the position monitoring module 1602 compares sensor data to the virtual model and if the sensor data does not match the virtual model (e.g. because the track was altered after the model was generated) the position monitoring module 1602 determines a parameter threshold is satisfied.

The speed monitoring module 1604 monitors sensor data from a motor encoder (e.g. RPM data) and determines whether the dolly's speed satisfies one or more speed thresholds. In one embodiment, the speed monitoring module 1604 monitors for whether the lowest speed threshold (e.g. from the global maximum speed, the maximum speed for overall track length, the maximum speed for the dolly's position and direction of travel on the track, the maximum speed based on the inclination of the track in that direction, etc.). In one embodiment, the speed monitoring module 1604 monitors the rate of change of speed (i.e. acceleration) and determines whether a maximum acceleration or deceleration threshold is satisfied.

The payload monitoring module 1606 monitors sensor data from one or more load sensors (e.g. strain gauges and/or load washers). The payload monitoring module 1606 monitors for and determines one or more of whether excessive torque is placed on the dolly 110 or its mounting hardware 112 and whether the payload is altered (e.g. mounting a heavier camera may require that the load test be repeated and safety parameters be adjusted). In one embodiment, the payload monitoring module may monitor for linear torque (i.e. back-and-forth), lateral torque (i.e. side-to-side or centripetal) and a total torque and parameter thresholds may exist for each.

The temperature monitoring module 1608 monitors sensor data from one or more temperature sensors (e.g. one or more of wheel temperature, motor temperature and battery temperature) and determines whether a temperature measurement satisfies a threshold.

The other parameter monitoring module 1610 monitors other sensor data and determines whether a threshold is satisfied. For example, assume the dolly includes a hatch sensor for detecting whether a maintenance hatch on the dolly is open; in one embodiment, the other parameter monitoring module 1610 monitors the sensor data and determines that a threshold is satisfied when the hatch is open. In another example, assume the controller 1100 includes one or more deadman switches (e.g. on controller 1100); in one embodiment, the other parameter monitoring module 1610 monitors the sensor data from the deadman switches to determine whether the switches are depressed and determines that a threshold is satisfied when the deadman switches are not depressed. In another example, the dolly 110 and/or dolly controller 1100 includes an emergency stop button and when the button is pressed a threshold is satisfied. In another example, the dolly 110 includes carry handle with an associated sensor and a threshold is satisfied when the carry handle is used (e.g. so the motors do not engage when the dolly 110 is being carried or not on the track).

When the safety parameter monitoring module 1506 determines that a threshold is satisfied, the safety parameter notifies the safety protocol module 1510 with an identifier of the safety parameter that was satisfied. In one embodiment, the safety parameter monitoring module 1506 passes the identifier to safety protocol module 1510. In one embodiment, the safety parameter monitoring module 1506 stores the identifier in the memory 1217 (or any other non-transitory storage medium communicatively accessible, e.g., a storage device). The other modules of the dolly control module 1220 including, e.g., the safety protocol module 1510, can retrieve the identifier by accessing the memory 1217 (or other non-transitory storage medium).

The obstruction/break detection module 1508 detects one or more of a break in the track and a track obstruction. In one embodiment, the obstruction/break detection module 1508 detects a break in the track. For example, assume the dolly 110 includes a laser distance scanner facing forward and down onto the track, when a section of track has fallen or if there is a sufficient gap between adjacent track sections, the distance sensor registers a change in the distance measured, the obstruction/break detection module 1508 detects the break based on the change in the distance measured. In one embodiment, the dolly includes two laser distance scanners; one facing fore and down the other facing aft and down, so that the obstruction/break module 1508 may detect a break in the track when the dolly 110 is traveling in either direction on the track 150.

In one embodiment, the obstruction/break detection module 1508 detects an obstruction on or near the track 150 (e.g. people, parts thereof, or objects). For example, assume the dolly 110 includes a laser safety scanner facing forward and scans for obstruction ahead of the dolly 110. Depending on the embodiment, the safety scanner may scan a horizontal plane ahead of the dolly 110 for obstructions or may have multiple scanning zones, which are preprogrammed and selected for scanning based on the track layout and the dolly's position. In one embodiment, each zone can have a different shape, for example, long and skinny, short and wide, look off to either side (e.g. to "see" around a curve). In one embodiment, the obstruction/break detection module 1508 selects a zone for scanning based on the track's configuration and the dolly's position on the track (and, according to some embodiments, the dolly's speed) using the virtual model of the track and the data library 1222. For example, the obstruction/break detection module 1508 determines that the dolly's position is nearing a horizontal curve and selects a zone off to one side, or both sides of the track to "see" around the curve. Such an embodiment may beneficially detect, avoid and protect people standing too close to the track, actors that stumble into harm's way, and apple boxes or other equipment left on the track. In one embodiment, the safety scanners may have multiple ranges. For example, in one embodiment, the safety scanners may have multiple ranges as well as multiple zones. For example, a safety scanner may have three ranges out to 20' for each zone that can trigger the dolly to slow down, do a soft stop, or at the closest range, perform a full, hard emergency stop (depending on the proximity and speed of the dolly 110 to the obstruction).

In one embodiment, the dolly 110 includes two laser safety scanners; one facing fore and the other facing aft, so that the obstruction/break module 1508 may detect an obstruction when the dolly 110 is traveling in either direction on the track 150. In one embodiment, the dolly 110 may include an ultrasonic proximity detector, or other sensor for detecting an obstruction instead of, or in addition to, the laser safety scanner(s).

The obstruction/break determination module 1504 monitors for a track obstruction or a break in the track 150 determines whether an obstruction or break is detected. In one embodiment, when a break or obstruction is detected, the obstruction/break detection module 1504 notifies the safety protocol module 1510. In one embodiment the notification includes an identifier indicating that the notification relates to an obstruction or break in the track 150 as the case may be. In one embodiment, the obstruction/break determination module 1504 passes a notification of the break or obstruction, depending on which is detected, to the safety protocol module 1510. In one embodiment, the obstruction/break determination module 1504 stores the notification of the break or obstruction in the memory 1217 (or any other non-transitory storage medium communicatively accessible, e.g., a storage device). The other modules of the dolly control module 1220 including, e.g., the safety protocol module 1510, can retrieve the notification of the break or obstruction by accessing the memory 1217 (or other non-transitory storage medium). In one embodiment, the notification of the obstruction or break includes an identifier associated with what was detected (e.g. a break or an obstacle) and the proximity of the dolly to the break or obstacle (e.g. immediate, near, upcoming).

The safety protocol module 1510 receives a notification, determines an appropriate safety protocol based on the received notification, determines the appropriate control signals based on the safety protocol and provides one or more safety override control signals.

In one embodiment, the safety protocol module 1510 receives a notification form one or more of the safety parameter monitoring module 1506 and the obstruction/break detection module 1508. In one embodiment, the notification includes an identifier that is associated with the unsafe condition being experienced. For example, a first identifier may be associated with an open hatch on the dolly (i.e. a first parameter being satisfied), a second identifier may be associated with an excessive load being experience (i.e. a second parameter being satisfied), a third identifier may be associated with an obstruction within a first (e.g. close/near) range of the dolly, a fourth identifier may be associated with an obstruction within a second (e.g. intermediate) range of the dolly 110, a fifth identifier may be associated with a break in the track 150, etc. It should be recognized that the preceding are merely examples of identifiers and that other identifier exist and may be associated with other unsafe conditions including, for example, the unsafe (i.e. potentially unsafe) conditions described throughout the written description and appendices.

In one embodiment, the safety protocol module 1510 determines a safety protocol based on the identifier in the notification. For example, the safety protocol upon receiving the first identifier in the example above obtains the safety protocol for an open hatch on the dolly from the data library 1222 and sends one or more control signals (e.g. do not move dolly 110, do not engage motors and keep brakes activated) associated with the safety protocol to the movement control module 1234 for implementation and enforcement. It should be recognized that the preceding is merely an example of matching an unsafe condition to a safety protocol to address/correct the unsafe condition and that other methods are contemplated and within the scope of this description.

The control signals sent to the movement control module 1234 may vary based on the safety protocol. For example, a safety protocol may require the dolly 110 to slow down, stop, move continuously at a slow speed, or to not start moving depending on the unsafe condition (which may be identified by the identifier).

In one embodiment, a safety protocol may dictate that the dolly be slowed or stopped. In one embodiment, there are multiple ways for the dolly's hardware to slow or stop, for example, using dynamic braking (i.e. braking while the motor shafts are still turning without failing), controlled motor deceleration and a combination of the two. In one embodiment, the safety protocol dictates how the dolly 110 is to be slowed or stopped and the associated control signals. Referring to the example above, when an obstruction is detected in the near range, the third identifier may be associated with a safety protocol that provides control signals for an emergency stop that applies the dynamic brakes and maximum controlled deceleration to try to stop the dolly 110 as soon as possible and to not collide with the obstruction; however, when an obstruction in the intermediate range is detected, the fourth identifier may be associated with a safety protocol that provides control signals for applying maximum controlled deceleration (but not the dynamic brakes) to try to stop the dolly 110 and not collide with the obstruction.

In one embodiment, the safety protocol module 1510 passes control signals to the movement control module 1234. In one embodiment, the safety protocol module 1510 stores the control signals in the memory 1217 (or any other non-transitory storage medium communicatively accessible, e.g., a storage device). The other modules of the dolly control module 1220 including, e.g., the movement control module 1234, can retrieve the control signals by accessing the memory 1217 (or other non-transitory storage medium).

Example Methods

FIGS. 17-26 are flowcharts illustrating example methods performed by the system of FIGS. 1-16 according to one embodiment. It should be realized that the methods of FIGS. 17-26 are merely examples of methods and that one or more of the methods may be modified (e.g. changing the order of the blocks, omitting blocks, adding blocks, etc.) and provide similar functionality and that such modifications do not departing from the disclosure herein.

Figure 17:
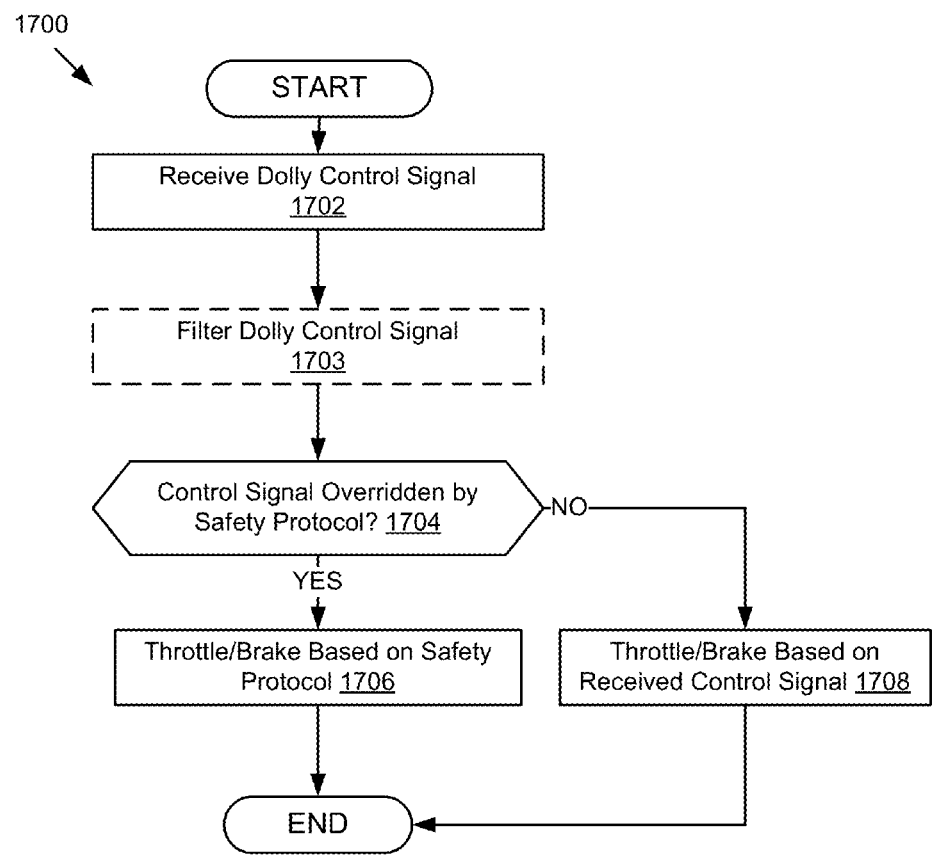
FIG. 17 is a flowchart of an example method for controlling the movement of a dolly according to one embodiment.

Referring now to FIG. 17, an example of a method 1700 for controlling the movement of the dolly 110 along the track 150 is shown according to one embodiment. In one embodiment, the method 1700 is performed using the movement control module 1234 and its sub-modules. The method 1700 begins at block 1702. At block 1702, the movement control module 1234 receives a control signal (e.g. from a controller 1100 via user control receiver module 1302, from the repetition module 1236 via playback control receiver module 1304, or from another dolly 110 via coordination control module 1306). Depending on the embodiment, the control signal received at block 1702 undergoes filtering at block 1703. At block 1704, the movement output module 1310 determines whether the control signal received at block 1702 is overridden by a safety protocol (e.g. based on a control signal received from safety module 1238 via the safety override module 1308 (not shown)).

When the movement output module 1310 determines that the control signal received at block 1702 is overridden by a safety protocol (1704-Yes), the method continues at block 1706. At block 1706, the movement output module 1310 sends a signal (e.g. to a motor) to throttle/brake based on the safety protocol (e.g. using control signals received from the safety module 1238) and the method 1700 ends (or is repeated). When the movement output module 1310 determines that the control signal received at block 1702 is not overridden by a safety protocol (1704-No), the method continues at block 1708. At block 1708, the movement output module 1310 sends a signal (e.g. to a motor) to throttle/brake based on the control signal received at block 1702 and the method 1700 ends (or is repeated).

Figure 18:
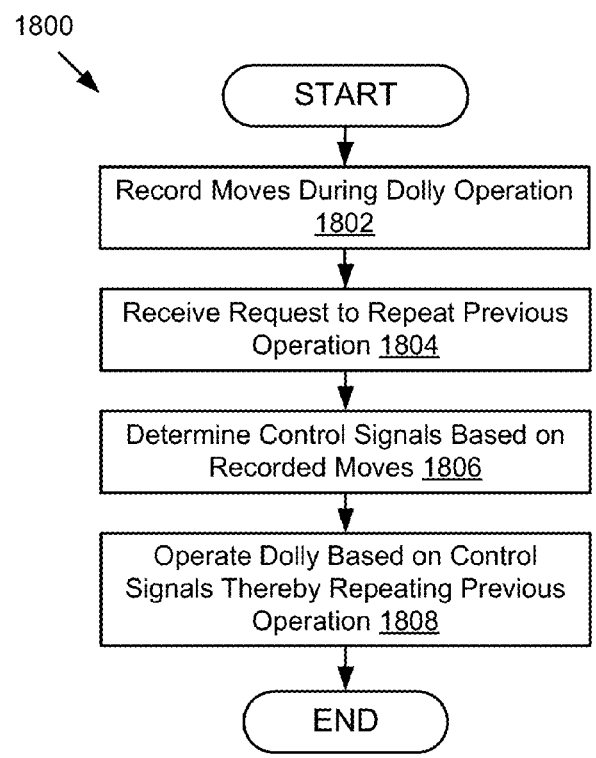
FIG. 18 is a flowchart of an example method for repeating a previous operation of a dolly according to one embodiment.

Referring now to FIG. 18, an example of a method 1800 for repeating an operation of the dolly 110. In one embodiment, the method 1800 is performed using the repetition module 1236 and its sub-modules. The method 1800 begins at block 1802. At block 1802, the recording module 1402 records moves (e.g. moves of one or more of the dolly, the camera and its components, boom, etc.) during the operation of the dolly. At block 1804, the playback request receiver module 1404 receives a request to repeat the previous operation of the dolly 110. At block 1806, the control signal determination module 1406 determines control signals based on the recorded moves, and, at block 1808, the movement output module 1310 operates (e.g. controls various, motors, actuators, solenoids, switches, etc.) the dolly, which may include operating associated devices (e.g. camera 130, boom, bloop light, etc.), to repeat the recorded operation and the method 1800 ends.

Figure 19:
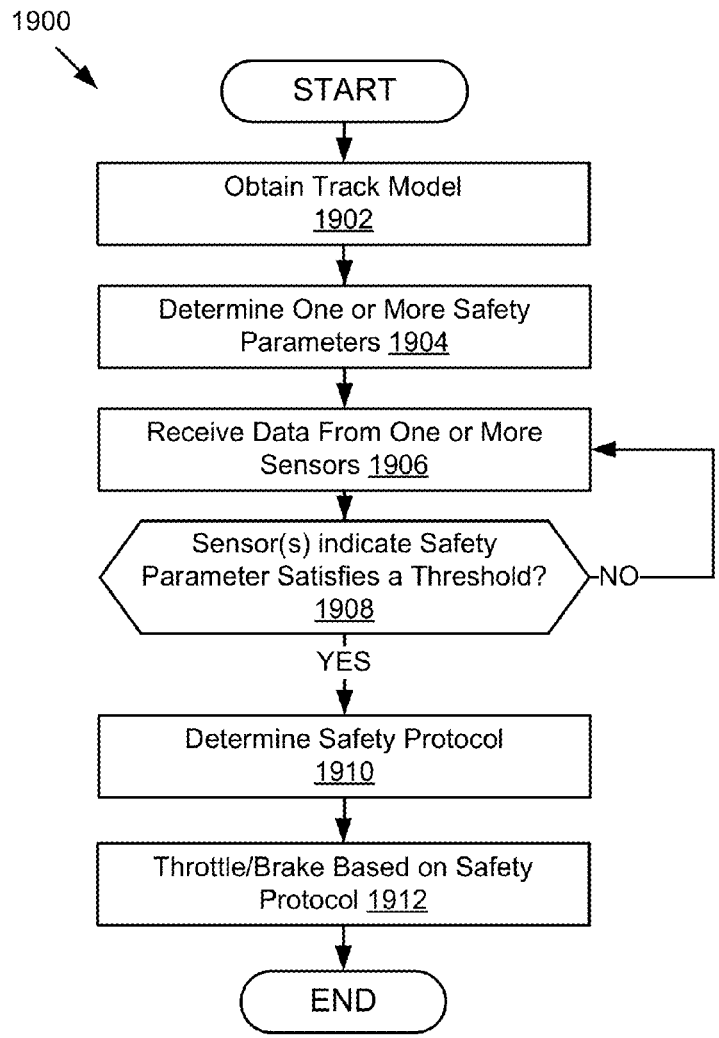
FIG. 19 is a flowchart of an example method for operating the dolly according to one embodiment.

Referring now to FIG. 19, an example of a method 1900 for operating the dolly 110. In one embodiment, the method 1900 is performed using the safety module 1228 and its sub-modules. The method 1900 begins at block 1902. At block 1902, the track modeling module 1502 obtains (e.g. generates) a track model (i.e. the virtual model). At block 1904, the safety parameter determination module 1504 determines one or more safety parameters. At block 1906, the safety parameter monitoring module 1506 receives sensor data, and, at block 1908, determines whether the sensor data received at block 1906 indicates that a safety parameter is satisfied.

When the safety parameter monitoring module 1504 determines that a safety parameter does not satisfy a threshold (1908-No), the method continues at block 1906 and blocks 1906 and 1908 are repeated throughout the operation of the dolly or until a safety parameter is satisfied (1908-Yes). When the safety parameter monitoring module 1504 determines that a safety parameter satisfies a threshold (1908-Yes), the method continues at block 1910. At block 1910, the safety protocol module 1510 determines a safety protocol and, at block 1912, sends the associated control signals (e.g. to throttle/brake).

Figure 20:
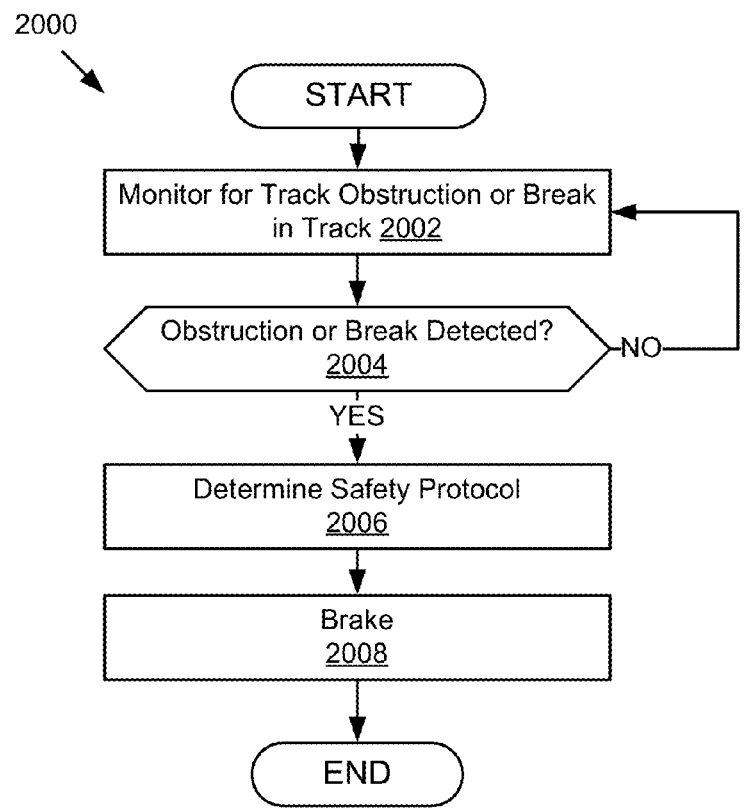
FIG. 20 is a flowchart of an example method for detecting one or more of an obstruction and a break in the track according to one embodiment.

Referring now to FIG. 20, an example of a method 2000 for detecting one or more of an obstruction and a break in the track 150 according to one embodiment. In one embodiment, the method 2000 is performed using the safety module 1328. The method 2000 begins at block 2002. At block 2002, the obstruction/break determination module 1504 monitors for a track obstruction or a break in the track 150. At block 2004, the obstruction/break determination module 1504 determines whether an obstruction or break is detected. When a break or obstruction is not detected (2004-No), the method 2000 continues at block 2002 and blocks 2002 and 2004 are repeated. When a break or obstruction is detected (2004-Yes), the method 2000 continues at block 2006. At block 2006, the safety protocol module 1510 determines a safety protocol responsive to the obstruction or break detected at block 2004. At block 2008, the movement control module 1234 applies the brakes based on the safety protocol determined at block 2006.

Figure 21:
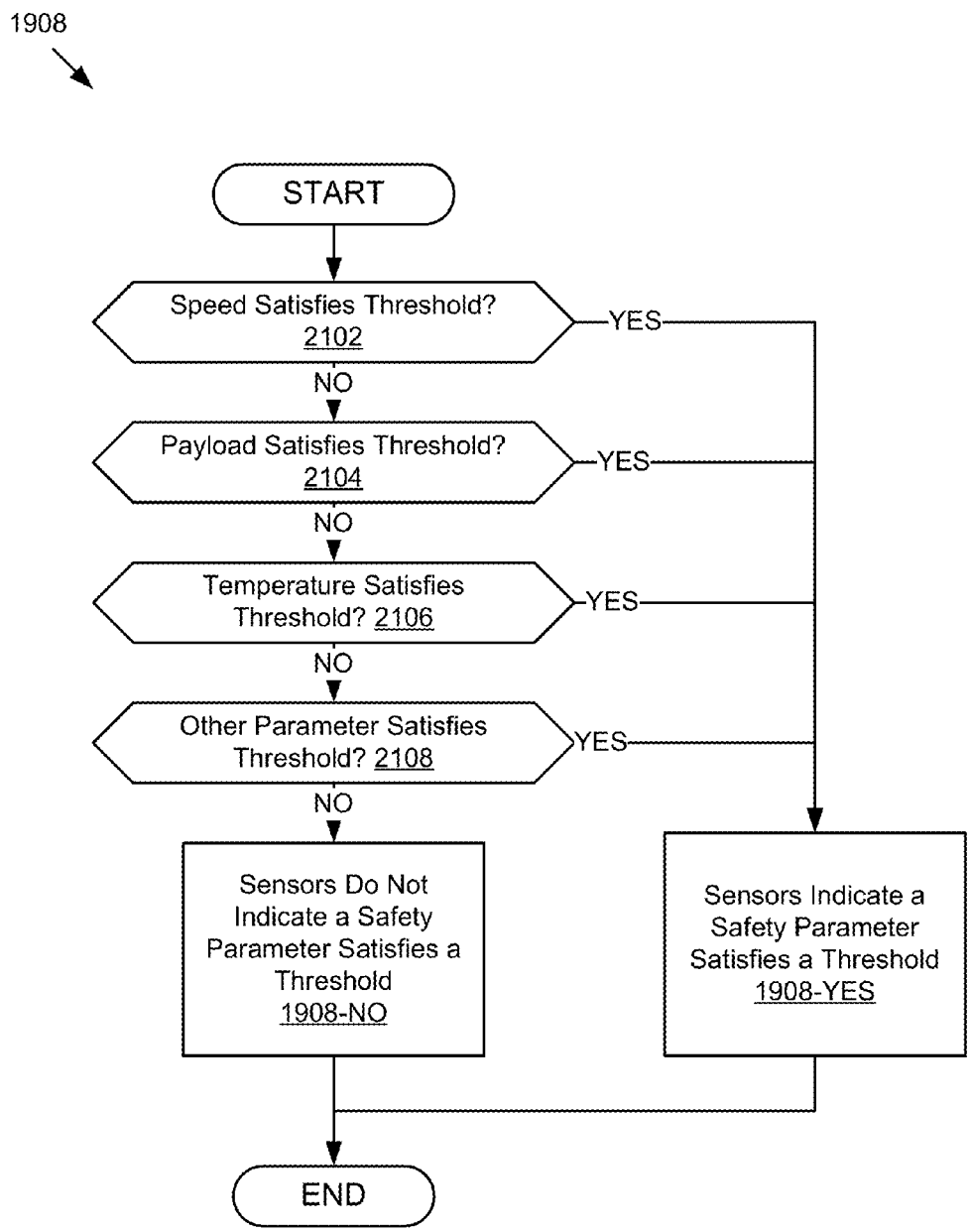
FIG. 21 is a flowchart of an example method for determining whether a parameter satisfies an associated threshold according to one embodiment.

Referring now to FIG. 21, an example of a method 1908 for determining whether a parameter satisfies an associated threshold. In one embodiment, the method 1908 is performed using the safety parameter monitoring module 1506. In one embodiment, method 1908 is performed at block 1908 of FIG. 19. In the illustrated embodiment, the method 1908 begins at block 2102. At block 2102, a speed monitoring module 1604 determines whether the speed of the dolly 110 satisfies a threshold. When the speed monitoring module 1604 determines that the speed of the dolly 110 satisfies a threshold (2102-Yes), the sensors indicate that a safety parameter is satisfied (block 1908-Yes) and the method 1908 ends. When the speed monitoring module 1604 determines that the speed of the dolly 110 does not satisfy a threshold (2102-No), the method 1908 continues at block 2104.

At block 2104, a payload monitoring module 1606 determines whether the payload of the dolly 110 satisfies a threshold. When the payload monitoring module 1606 determines that the payload of the dolly 110 satisfies a threshold (2104-Yes), the sensors indicate that a safety parameter is satisfied (block 1908-Yes) and the method 1908 ends. When the payload monitoring module 1606 determines that the payload of the dolly 110 does not satisfy a threshold (2104-No), the method 1908 continues at block 2106.

At block 2106, a temperature monitoring module 1608 determines whether the temperature of the dolly 110 or a component thereof (e.g. wheels) satisfies a threshold. When the temperature monitoring module 1608 determines that the temperature of the dolly 110 or a component thereof satisfies a threshold (2106-Yes), the sensors indicate that a safety parameter is satisfied (block 1908-Yes) and the method 1908 ends. When the temperature monitoring module 1608 determines that the temperature of the dolly 110 or a component thereof does not satisfy a threshold (2106-No), the method 1908 continues at block 2108.

At block 2108, an other parameter monitoring module 1610 determines whether another parameter of the dolly 110 satisfies a threshold (e.g. an open maintenance hatch on the dolly 110). When the other parameter monitoring module 1610 determines that the other parameter of the dolly 110 satisfies a threshold (2108-Yes), the sensors indicate that a safety parameter is satisfied (block 1908-Yes) and the method 1908 ends. When the other parameter monitoring module 1610 determines that the other parameter of the dolly 110 does not satisfy a threshold (2108-No), the sensors indicate that a safety parameter is not satisfied (block 1908-No) and the method 1908 ends (or is repeated).

Figure 22:
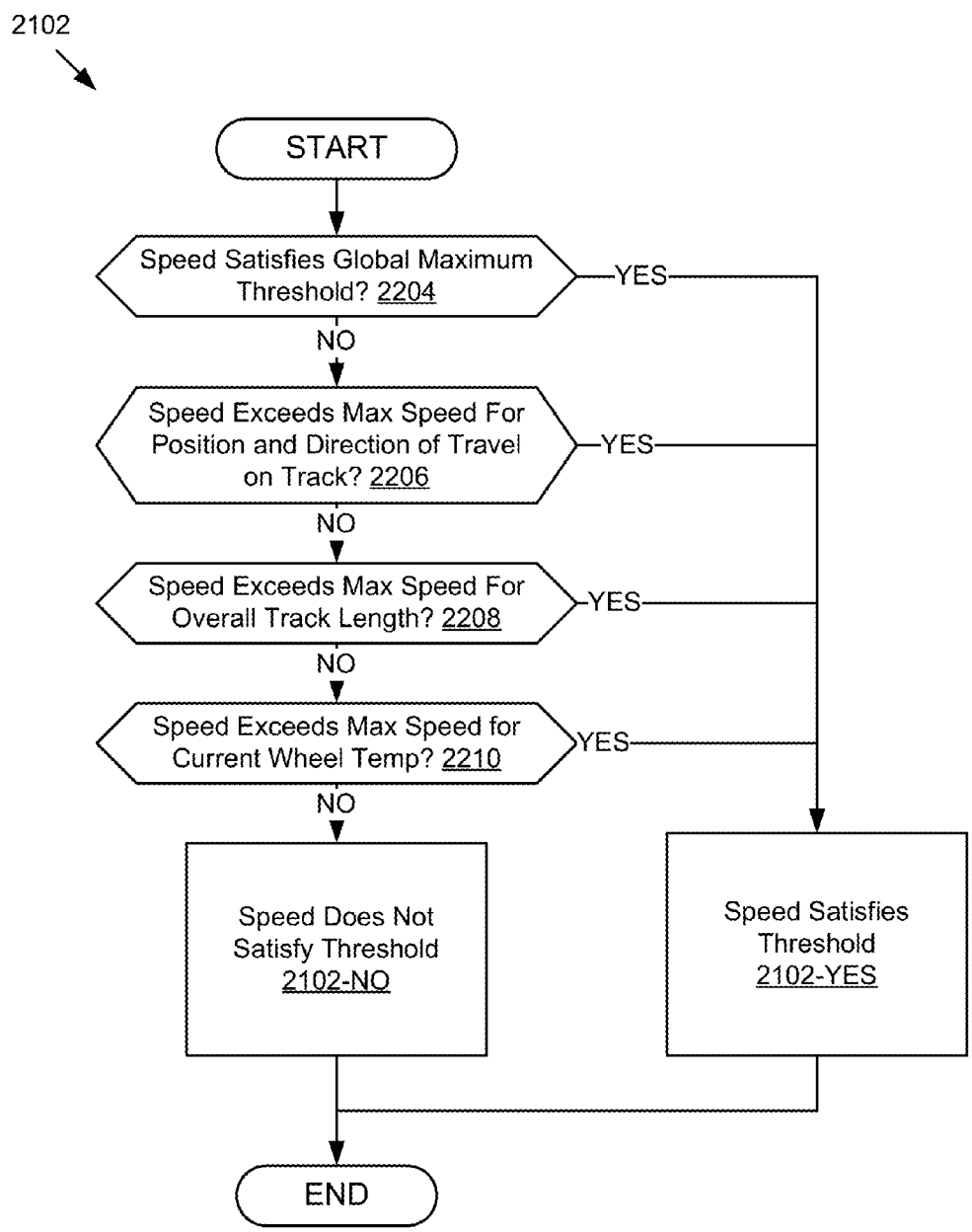
FIG. 22 is a flowchart of an example method for monitoring a dolly's speed according to one embodiment.

Referring now to FIG. 22, an example of a method 2102 for monitoring a dolly's speed according to one embodiment. In one embodiment, the method 2102 is performed using the speed monitoring module 1604. In one embodiment, the method 2104 is the method performed at block 2102 of FIG. 21. The method 2102 begins at block 2204. At block 2204, the speed monitoring module 1604 determines whether the dolly's speed satisfies a global maximum speed threshold. At block 2206, the speed monitoring module 1604 determines whether the dolly's speed satisfies a maximum speed for the dolly's position and direction of travel. At block 2208, the speed monitoring module 1604 determines whether the dolly's speed satisfies a maximum speed for the overall length of the track. At block 2210, the speed monitoring module 1604 determines whether the dolly's speed satisfies a maximum temperature for the current wheel temperature.

When the speed monitoring module 1604 determines that any of the speed thresholds are satisfied (2204-Yes), (2206-Yes), (2208-Yes) or (2210-Yes), the speed satisfies a threshold (2102-Yes). When the speed monitoring module 1604 determines that none of the speed thresholds are satisfied (2204-No), (2206-No), (2208-No) or (2210-No), the speed does not satisfy a threshold (2102-No).

Figure 23:
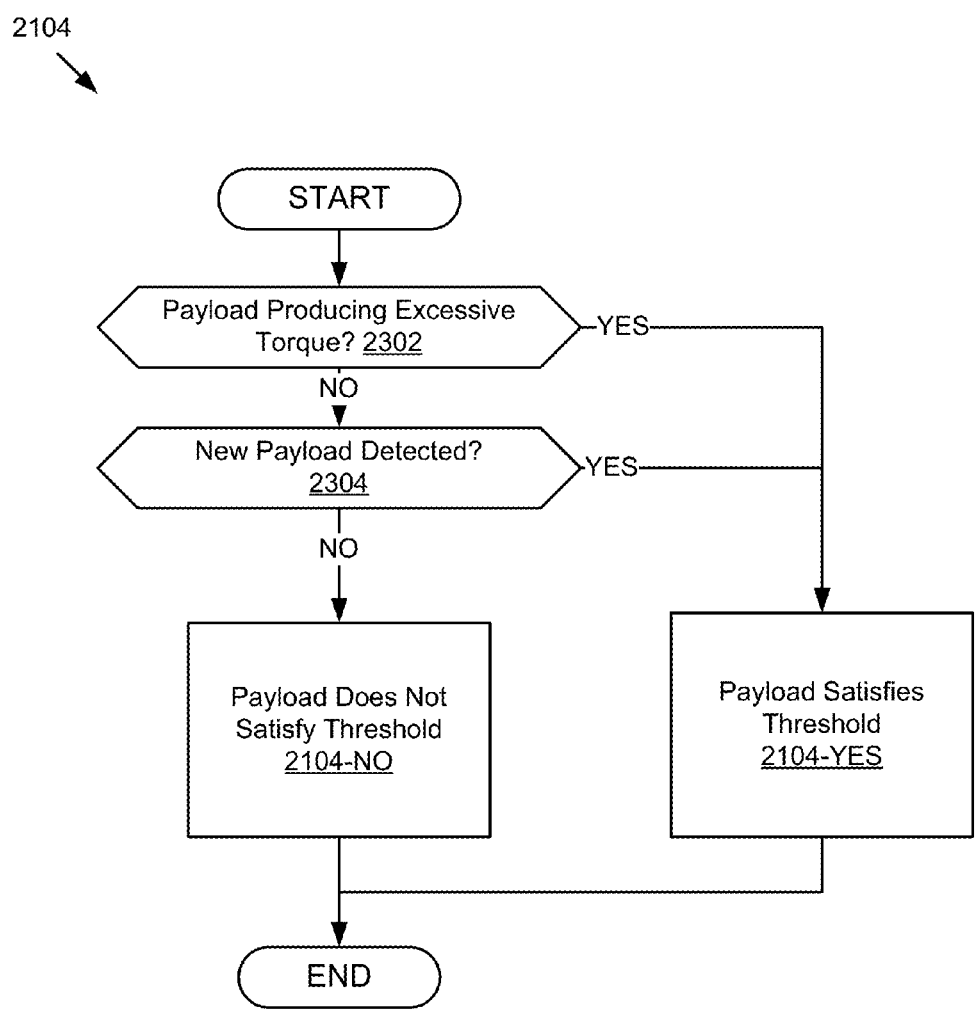
FIG. 23 is a flowchart of an example method for monitoring a dolly's payload according to one embodiment.

Referring now to FIG. 23, an example of a method 2104 for monitoring a dolly's payload according to one embodiment. In one embodiment, the method 2104 is performed using the payload monitoring module 1606. In one embodiment, the method 2104 is the method performed at block 2104 of FIG. 21. The method 2104 begins at block 2302. At block 2302, the payload monitoring module 1606 continuously monitors the load sensors determines whether the dolly's payload is producing excessive torque. When the payload monitoring module 1606 determines the payload is producing excessive torque (2302-Yes), the payload satisfies a threshold (block 2104-Yes) and the method 2104 ends. When the payload monitoring module 1606 determines the payload is not producing excessive torque (2302-No), the method continues at block 2304.

At block 2304, the payload monitoring module 1606 determines whether the dolly's payload has been altered. When the payload monitoring module 1606 determines the payload has been altered (2304-Yes), the payload satisfies a threshold (block 2104-Yes) and the method 2104 ends. When the payload monitoring module 1606 determines the payload has not been altered (2304-No), the payload does not satisfy a threshold (block 2104-No) and the method 2104 ends (or is repeated).

Figure 24:
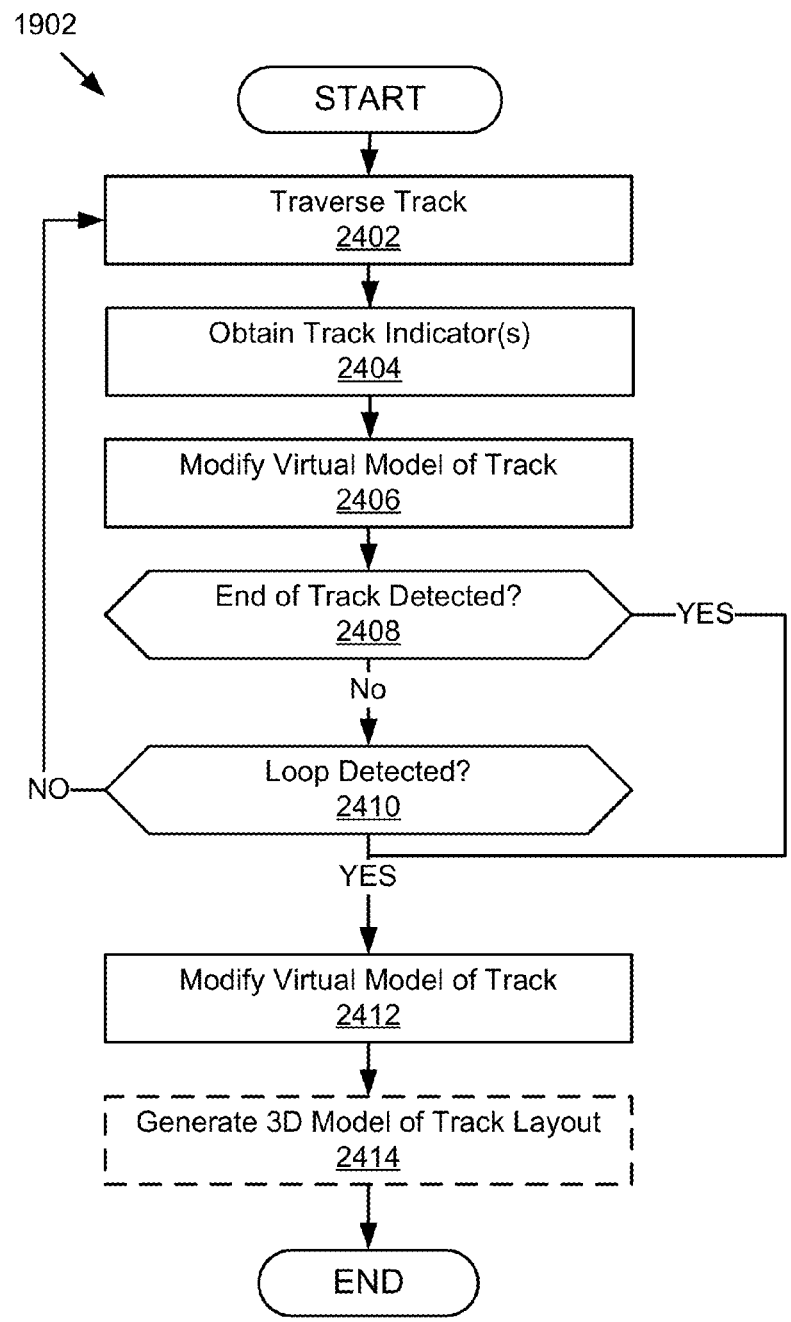
FIG. 24 is a flowchart of an example method for modeling a track configuration according to one embodiment.

Referring now to FIG. 24, an example of a method 1902 for modeling a track configuration according to one embodiment. In one embodiment, the method 1902 is performed using the track modeling module 1502. In one embodiment, the method 1902 is the method performed at block 1902 of FIG. 19. The method 1902 begins at block 2402. At block 2402, the track modeling module 1502 traverses the dolly 110 across the track 150 (e.g. by interacting with the movement control module 1234 or by allowing the user to "slew" along the track or by the user manually pushing/pulling the dolly 110). While the dolly 110 traverses the track 150, the track modeling module 1502 obtains track indicators form the track indicator sensor, at block 2404, and modifies (e.g. updates) the virtual model, at block 2406, based on the received track indicators. In some embodiments, the track modeling module 1502 may simultaneously update the virtual model with inclinometer measurements from an IMU (not shown).

At block 2408, the track modeling module 1502 determines whether the dolly has reached the end of the track. When the track modeling module 1502 determines that the dolly has reached the end of the track (2408-Yes), the method 1902 continues at block 2412. When the track modeling module 1502 determines that the dolly has not reached the end of the track (2408-No), the method 1902 continues at block 2410.

At block 2410, the track modeling module 1502 determines whether the track is configured in a loop, i.e., whether a loop is detected. When the track modeling module 1502 determines that the track is configured in a loop (2410-Yes), which may be confirmed with a query to and response from the user in some embodiments, the method 1902 continues at block 2412. When the track modeling module 1502 determines that the track is not configured in a loop (2410-No), the method 1902 continues at block 2402 and blocks 2402, 2404, 2406 and 2408 are repeated. Blocks 2402, 2404, 2406, 2408 and 2410 may be repeated until either the end of the track is detected (2408-Yes) or a loop is detected (2410-Yes).

At block 2412, the track modeling module 1502 modifies the virtual model (e.g. updates the virtual model with the end of the track or by closing the loop). At block 2414, the track modeling module 1502 optionally generates a 3D model of the track layout for presentation to a user and the method 1902 ends.

Figure 25:
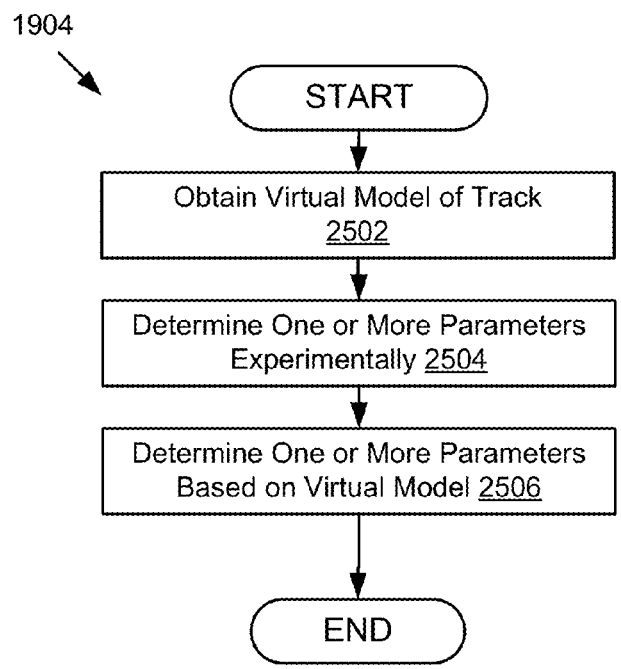
FIG. 25 is a flowchart of an example method for determining one or more safety parameters according to one embodiment.

Referring now to FIG. 25, an example of a method 1904 for determining one or more safety parameters according to one embodiment. In one embodiment, the method 1904 is performed using the safety parameter determination module 1504. In one embodiment, the method 1904 is the method performed at block 1904 of FIG. 19. The method begins at block 2502. At block 2502, the safety parameter determination module 1504 obtains a virtual model of the track from the track modeling module 1502. At block 2504, the safety parameter determination module 1504 determines one or more parameters experimentally. For example, in one embodiment, the safety parameter determination module 1504 determines a max acceleration and deceleration, and maximum speed on curves of various radii, based on torques exhibited by the dolly's payload when a predetermined acceleration and deceleration is performed. At block 2504, the safety parameter determination module 1504 determines one or more parameters based on the virtual model and the method 1904 ends. For example, in one embodiment, the safety parameter determination module 1504 determines a maximum speed and the default electronic gearshift based on the overall track length and a maximum speed at any given position based on the virtual model and, depending on the embodiment, the experimental load test.

Figure 26:
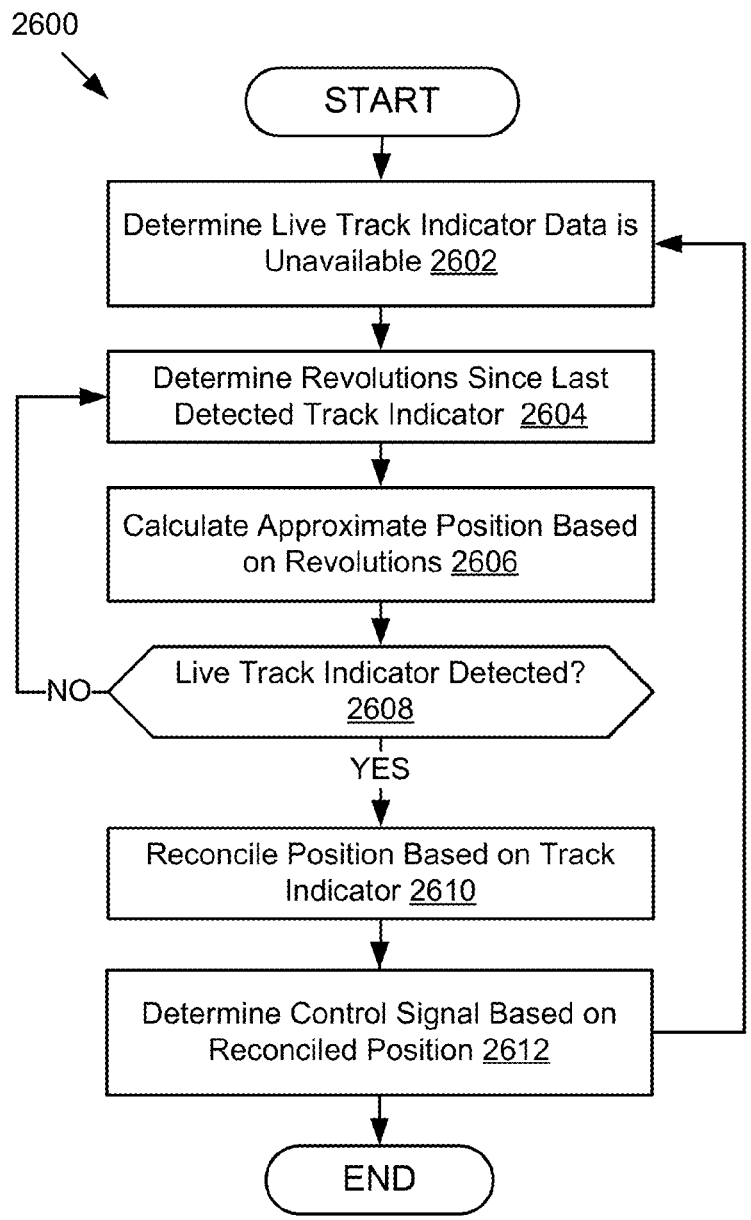
FIG. 26 is a flowchart of an example method for reconciling and determining a dolly's position on a track according to one embodiment.

Referring now to FIG. 26, an example of a method 2600 for reconciling and determining a dolly's position on track 150. Depending on the embodiment, the reconciliation and determination method 2600 may be performed by one or more modules. For example, in one embodiment, the safety module 1238 or a sub-module thereof (e.g. position monitoring module 1602) performs method 2600 (e.g. to determine a safety parameter based on the dolly's position on the track and ensure the dolly stops before the end of the track). In one embodiment, the repetition module 1236 or a sub-module thereof performs the reconciliation (e.g. to accurately record and reproduce a previous dolly operation). In one embodiment, a module (e.g. the position monitoring module 1602) performs the reconciliation and determination and shares the results with another module (e.g. the repetition module 1236 and its sub-modules 1402, 1406).

The method 2600 begins at block 2602. At block 2602, the position monitoring module 1602 determines that live track indicator data is no longer available from the track indicator sensor (e.g. because the dolly is travelling too fast for the track indicator sensor to detect the indicators or because a track indicator has been damaged or obscured). At block 2604, the position monitoring module 1602 determines a number of revolutions of the wheels since the last detected track indicator, and, at block 2606 calculates an approximate position of the dolly 110 on the track 150.

At block 2608, a determination is made as to whether a live track indicator is detected. When a live track indicator has not been detected (2608-No), the method continues at block 2604 and blocks 2604, 2606 and 2608 are repeated until a live track indicator is detected (2608-Yes). When a live track indicator has been detected (2608-No), the method continues at block 2610. At block 2610, the position monitoring module 1602 reconciles the position of the dolly based on the live track indicator detected at block 2608. At block 2612, a control signal (which may use filtering) is determined based on the reconciled position (e.g. by the safety module 1238, a repetition module 1236, or both) and the method 2600 ends.

In the above description and the appendices, for purposes of explanation, numerous specific details are indicated in order to provide a thorough understanding of the technology described. It should be apparent, however, that this technology may be practiced without these specific details. In other instances, structures and devices are shown in order to avoid obscuring the technology. For example, the present technology is described with some implementations above, with reference to user interfaces and particular hardware.

Moreover, the present technology is described above primarily in the context of the television and film industry; however, the present technology may apply to other contexts and industries; such as sports events, concerts, awards shows, scientific experiments, manufacturing, military/security operations and medical procedures.

Reference in the specification to "one embodiment," "an embodiment," or "some embodiments" simply means that one or more particular features, structures, or characteristics, described in connection with the one or more embodiments, is included in at least one or more embodiments that are described. Any appearance of the phrase "in one embodiment" in various places in the specification is not necessarily referring to the same implementation or instance.

The present technology also relates to an apparatus for performing the operations described here. This apparatus may be specially constructed for the required purposes, or it may include a general-purpose computer selectively activated or reconfigured by a computer program stored in a computing device (e.g. the microcontroller 1200). Such a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with nonvolatile memory or any type of media suitable for storing electronic instructions, each coupled to a computer system bus.

Elements of this technology may take the form of an entirely hardware implementation, an entirely software implementation, or an implementation including both hardware and software components. In some implementations, elements of this technology are implemented in software, which includes but is not limited to firmware, resident software, microcode, etc.

Furthermore, this technology include a computer program product accessible from a computer-usable or computer-readable medium providing program code for use by or in connection with a computer or any instruction execution system. For the purposes of this description, a computer-usable or computer-readable medium may be any apparatus that may include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times, code is retrieved from bulk storage during execution.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be implemented in other specific forms, without departing from the spirit or essential characteristics thereof. Accordingly, the disclosure of the present technology is intended to be illustrative, but not limiting, of the scope of the present disclosure, which is set forth in the following claims.

What is claimed is:

1. A system comprising:
    a reconfigurable track comprising a plurality of connectable, portable, modular track sections, the plurality of connectable, portable, modular track sections including a first track section and a second track section, the first track section and the second track section each including two or more track indicators readable by a track indicator senor and used to build a virtual model of the reconfigurable track in a current configuration, wherein one or more safety parameters for movement of the dolly along the reconfigurable track are determined automatically based on the virtual model of the reconfigurable track used to determine a dolly's position on the track and;
    the dolly including one or more sensors and a processor, the one or more sensors including the track indicator sensor, the dolly including a removable camera as a payload, a movement of the removable camera controlled independent of a movement of the dolly, the processor executing instructions that control an operation of the dolly including moving the dolly at least semi-autonomously along the reconfigurable track based on the track indicators,
    wherein the virtual model of the current configuration of the reconfigurable track is generated based on the track indicator sensor reading the track indicators of the first and second track sections, wherein moving the dolly at least semi-autonomously includes one of moving the dolly autonomously and moving the dolly semi-autonomously, the movement of the dolly restricted based on one or more thresholds associated with one or more safety parameters, the one or more thresholds determined based on the virtual model of the current configuration of the reconfigurable track and the dolly's position on the reconfigurable track, the position of the dolly on the track determined based in part on a detection of a track indicator.

2. The system of claim 1, wherein moving the dolly at least semi-autonomously includes repeating a previous operation of the dolly using sensor data captured during the previous operation of the dolly that is to be repeated.

3. The system of claim 1, the processor executing instructions that control an operation of the dolly including moving the dolly at least semi-autonomously along the reconfigurable track based on the track indicators includes recording sensor data from at least a subset of the one or more sensors of the dolly during a first operation of the dolly, the sensor data describing the first operation of the dolly and, responsive to receiving a request to repeat the first operation of the dolly during a subsequent operation of the dolly, determining one or more control signals for repeating the first operation of the dolly based on the recorded sensor data and automatically operating the dolly based on the one or more determined control signals thereby repeating the first operation of the dolly in the subsequent operation of the dolly.

4. The system of claim 3, wherein the first operation of the dolly includes movement of the dolly along the reconfigurable track based the track indicators and operation of the removable camera payload.

5. The system of claim 1, the processor executing instructions that control an operation of the dolly including determining a threshold associated with a safety parameter; monitoring sensor data associated with the safety parameter, the sensor data from at least a subset of the one or more sensors; determining that the sensor data satisfies the threshold associated with the safety parameter; determining a safety protocol associated with the satisfied threshold responsive to determining that the threshold is satisfied; and operating the dolly based on the determined safety protocol.

6. The system of claim 1, wherein a track indicator is a barcode.

7. A method comprising:
    generating, using one or more processors, a virtual model of a present configuration of a reconfigurable track based on track indicators read using a track indicator sensor of a dolly, the reconfigurable track including a plurality of connectable, portable, modular track sections, the plurality of connectable, portable, modular track sections including a first track section and a second track section, the first track section and the second track section each including two or more track indicators readable by a track indicator senor;
    receiving, using the one or more processors, sensor data from one or more sensors of a dolly during a first operation of the dolly, the dolly including a removable camera as a payload, a movement of the removable camera able to be controlled independent of a movement of the dolly, the sensor data describing the first operation of the dolly, the first operation of the dolly restricted based on one or more thresholds associated with one or more safety parameters, the one or more thresholds determined based on the virtual model of the current configuration of the reconfigurable track and the dolly's position on the reconfigurable track, the position of the dolly on the track determined based in part on a detection of a track indicator;

recording, using the one or more processors, the sensor data describing the first operation of the dolly;

receiving, using the one or more processors, a request to repeat the first operation of dolly during a subsequent operation of the dolly;

determining, using the one or more processors, one or more control signals based on the recorded sensor data for repeating the first operation of the dolly; and automatically operating, using the one or more processors, the dolly based on the one or more determined control signals thereby repeating the first operation of the dolly in the subsequent operation of the dolly and recreating the sensor data.

8. The method of claim 7, wherein the operation of the dolly includes movement of the dolly along the reconfigurable track based sensor data associated with a track indicator and operation of the removable camera payload.

9. The method of claim 7, wherein the operation of the dolly includes a movement of the dolly along the reconfigurable track and an operation of a device associated with the dolly, wherein the sensor data includes sensor data describing the movement of the dolly along a track, which is received and recorded as a first set of one or more channels, and sensor data describing the operation of the removable camera payload associated with the dolly, which is received and recorded as a second set of one or more channels, and a user individually modifies one or more selected channels to alter the subsequent operation of one or more of the dolly and the removable camera payload.

10. The method of claim 7, wherein the operation of the dolly includes a movement of the dolly along the reconfigurable track and an operation of the removable camera payload, wherein the removable camera payload includes a multi-axis camera head and automatically operating the dolly based on the one or more determined control signals repeats the movement of the dolly along the reconfigurable track and repeats the operation of the multi-axis camera head including one or more of the pan, tilt, roll and focus of the multi-axis camera.

11. The method of claim 7, wherein the first operation of the dolly is controlled at least in part by control signals from user input and, responsive to receiving the request to repeat the first operation of the dolly, the one or more control signals are determined and the dolly is operated automatically and without further user input.

12. The method of claim 7, wherein the first operation of the dolly is performed manually by a human user and repeated automatically when the dolly determines the one or more control signals and operates itself.

13. A method comprising:
determining, using one or more processors, a threshold associated with a parameter for safely operating a dolly in a present configuration of a reconfigurable track based on a virtual model generated using track indicators read using a track indicator sensor of the dolly, the reconfigurable track including a plurality of connectable, portable, modular track sections, the plurality of connectable, portable, modular track sections including a first track section and a second track section, the first track section and the second track section each including two or more track indicators readable by the track indicator sensor;

monitoring, using the one or more processors, sensor data associated with the parameter, the sensor data from one or more sensors of a dolly, the dolly having a payload including a removable camera as a payload, a movement of the removable camera able to be controlled independent of a movement of the dolly;

determining, using the one or more processors, that the sensor data satisfies the threshold associated with the parameter;

determining, using the one or more processors, a safety protocol associated with the satisfied threshold responsive to determining that the threshold is satisfied; and operating, using the one or more processors, the dolly based on the determined safety protocol.

14. The method of claim 13, wherein monitoring sensor data associated with the parameter comprises:
determining a position of the dolly on the reconfigurable track based at least in part on sensor data associated with a track indicator; and
determining a safety parameter associated with the position of the dolly on the reconfigurable track.

15. The method of claim 14, wherein determining a position of the dolly on the reconfigurable track based at least in part on sensor data associated with the track indicator comprises:
determining whether a most recent track indicator received from a track indicator sensor is a live track indicator, wherein the live track indicator is associated with a position on the track where the dolly is presently;
responsive to determining that the most recent track indicator is a live track indicator, determining that the dolly's position on the track is the position associated with the most recent track indicator; and
responsive to determining that the most recent track indicator is not a live track indicator, determining a distance traveled since the most recent track indicator was received and determining that the dolly's position on the track is the determined distance from the most recent track indicator.

16. The method of claim 13, wherein the track indicator is a barcode and a plurality of barcodes run the length of the reconfigurable track.

17. The method of claim 13, wherein the sensor data satisfies the threshold associated with the parameter when the sensor data indicates an obstruction or break in a track.

18. The method of claim 13, wherein the sensor data satisfies the threshold associated with the parameter when the sensor data indicates that an end of the reconfigurable track is approaching.

19. The method of claim 13, wherein the sensor data satisfies the threshold associated with the parameter when the sensor data indicates one or more of the dolly's speed exceeds a maximum speed and the dolly's payload is exerting a torque in excess of a maximum torque.

20. The method of claim 13, wherein determining a threshold associated with a parameter for safely operating the dolly on the reconfigurable track comprises:
receiving sensor data including track indicators detected using a track indicator sensor while traversing the dolly across the track during a slow-speed initialization;
generating the virtual model based at least in part on the received track indicators, the virtual model representing the reconfigurable track's present configuration; and
determining the threshold based on the virtual model.

* * * * *